United States Patent [19]

Maruyama et al.

[11] Patent Number: 5,801,676
[45] Date of Patent: Sep. 1, 1998

[54] IMAGE DISPLAY APPARATUS FOR PROCESSING GRAPHICS INSTRUCTIONS FROM A STORAGE DEVICE

[75] Inventors: Toshihiro Maruyama, Kawasaki; Kazuo Hikawa, Yokohama, both of Japan

[73] Assignee: Victor Company of Japan, Ltd., Yokohama, Japan

[21] Appl. No.: 515,901

[22] Filed: Aug. 16, 1995

[30] Foreign Application Priority Data

Aug. 29, 1994 [JP] Japan .................................. 6-226030
Aug. 29, 1994 [JP] Japan .................................. 6-226032

[51] Int. Cl.$^6$ ............................................. G09G 5/34
[52] U.S. Cl. ............................................. 345/123
[58] Field of Search ..................... 345/185, 123–125, 345/326; 395/341, 973; 434/307 A, 316

[56] References Cited

U.S. PATENT DOCUMENTS 4,706,076  11/1987  Racchini .
4,714,919  12/1987  Foster .
4,873,514  10/1989  Nakagawa et al. .
5,125,078  6/1992  Matsuda et al. .
5,602,566  2/1997  Motosyuku et al. .
5,613,909  3/1997  Steluvsky .

Primary Examiner—Mark R. Powell
Attorney, Agent, or Firm—Louis Woo

[57] ABSTRACT

In response to a "PAUSE RELEASE" command, a CD drive 1 resumes a playback operation earlier than the "PAUSE" position. The control module 2 analyzes whether continuity is recognized in the time information between a newly entered instruction and a finally processed instruction memorized in the memory 7. Graphic processing and development processing are canceled until the continuity is found. The image data developed in an internal memory 8 is transferred to an external memory 10 through a format conversion module 9. The control module 2 cancels a processing of the newly entered instruction when the newly entered instruction is either Soft Scroll Screen with Preset instruction or Soft Scroll Screen with Copy instruction having a scroll dot number smaller than a predetermined number. Alternatively, all the dot units scroll can be canceled while only the character units scroll can be performed.

6 Claims, 25 Drawing Sheets

PRIOR ART

DEVELOPED RESULT (a) ACCURATE PLAYBACK WITHOUT ERRORS (b) DISCONTINUOUS PLAYBACK WITH UNDESIRABLE SKIP (c) DISCONTINUOUS PLAYBACK WITH UNDESIRABLE REPETITION

FIG. 10

| Bit | R | S | T | U | V | W |
|---|---|---|---|---|---|---|
| Symbol 0 | 0 | 0 | 1 | 0 | 0 | 1 |
| 1 | INSTRUCTION ||||||
| 2 | PARITY Q0 ||||||
| 3 | PARITY Q1 ||||||
| 4 | DATA field ||||||
| . |  ||||||
| . |  ||||||
| . |  ||||||
| . |  ||||||
| 19 |  ||||||
| 20 | PARITY P0 ||||||
| 21 | PARITY P1 ||||||
| 22 | PARITY P2 ||||||
| 23 | PARITY P3 ||||||

FIG. 13

DATA STORAGE BUFFER

| | | | | | | |
|---|---|---|---|---|---|---|
| t | 09 | 06 | XX | R1 | C1 | ch1 | ** ** ** ** | ← WRITE FONT INSTRUCTION |
| t+1 | 09 | 38 | XX | R1 | C1 | ch1 | ** ** ** ** | ← EX-OR FONT INSTRUCTION |

BUFFER ADDRESS

FIG. 14

DATA STORAGE BUFFER

| | | | | | | | | | |
|---|---|---|---|---|---|---|---|---|---|
| t | 09 | 06 | XX | XX | R1 | C1 | ch1 | ** ** ** | WRITE FONT INSTRUCTION |
| t+1 | 09 | 06 | XX | XX | R1 | C1 | ch2 | ** ** ** | WRITE FONT INSTRUCTION (SAME POSITION, DIFFERENT CHANNEL) |
| t+2 | 09 | 02 | XX | XX | ** | ** | ** | ** | PRESET BORDER INSTRUCTION |
| t+3 | 09 | 38 | XX | XX | R1 | C1 | ch1 | ** ** ** | EX-OR FONT INSTRUCTION |

BUFFER ADDRESS

FIG. 17

SUBCODES READ OUT FROM CD

| | | |
|---|---|---|
| | ......................... | |
| t1 | 09 30 XX XX 00 00 00 01 01 01 ——— | LOAD CLUT 0 INSTRUCTION |
| t2 | 09 31 XX XX 08 08 08 09 09 09 ——— | LOAD CLUT 1 INSTRUCTION |
| t3 | 09 01 XX XX 01 ** | PRESET MEMORY INSTRUCTION |
| t4 | 09 02 XX XX 01 | PRESET BORDER INSTRUCTION |
| | ......................... | |
| t5 | 09 01 XX XX 01 ** | PRESET MEMORY INSTRUCTION |
| t6 | 09 02 XX XX 01 | PRESET BORDER INSTRUCTION |
| t7 | 09 01 XX XX 02 ** | PRESET MEMORY INSTRUCTION |
| t8 | 09 02 XX XX 02 | PRESET BORDER INSTRUCTION |
| t9 | 09 30 XX XX 00 00 00 01 01 01 ——— | LOAD CLUT 0 INSTRUCTION |
| t10 | 09 31 XX XX 08 08 08 09 09 09 ——— | LOAD CLUT 1 INSTRUCTION |
| | ......................... | |
| t11 | 09 30 XX XX 00 00 00 01 01 01 ——— | LOAD CLUT 0 INSTRUCTION |
| t12 | 09 31 XX XX 08 08 08 09 09 09 ——— | LOAD CLUT 1 INSTRUCTION |
| t13 | 09 01 XX XX 02 ** | PRESET MEMORY INSTRUCTION |
| t14 | 09 02 XX XX 02 | PRESET BORDER INSTRUCTION |

XX: parity
**: repeat value

FIG. 20

CH: CHARACTER UNITS
   (0: NO SCROLL, 1: RIGHT ONE CHARACTER, 2: LEFT ONE CHARACTER)
PH: DOT UNITS (OFFSET AMOUNT BY DOT(S) IN RIGHT DIRECTION)

| CH | PH | 1 DOT (PRIOR ART) | 2 DOTS | 3 DOTS |
|----|----|----|----|----|
| 0 | 0 | | | |
| 0 | 1 | | | |
| 0 | 2 | | | |
| 0 | 3 | | | |
| 0 | 4 | | | |
| 0 | 5 | | | |
| 1 | 0 | | | |
| 2 | 5 | | | |
| 0 | 4 | | | |
| 0 | 3 | | | |
| 0 | 2 | | | |
| 0 | 1 | | | |
| 0 | 0 | | ※ | ※ |

※ FORCIBLY EXECUTE SCROLL PROCESSING
   FOR INITIALIZATION IN CASE OF
   PH=0, REGARDLESS OF A SHIFT AMOUNT

FIG. 21

CH: CHARACTER UNITS
   (0: NO SCROLL, 1: RIGHT ONE CHARACTER, 2: LEFT ONE CHARACTER)
PH: DOT UNITS (OFFSET AMOUNT BY DOT(S) IN RIGHT DIRECTION)

| CH | PH | 1 DOT (STANDARD) | CHARACTER UNITS ONLY |
|----|----|------------------|----------------------|
| 0  | 0  |                  |                      |
| 0  | 1  |                  |                      |
| 0  | 2  |                  |                      |
| 0  | 3  |                  |                      |
| 0  | 4  |                  |                      |
| 0  | 5  |                  |                      |
| 1  | 0  |                  |                      |
| 2  | 5  |                  |                      |
| 0  | 4  |                  |                      |
| 0  | 3  |                  |                      |
| 0  | 2  |                  |                      |
| 0  | 1  |                  |                      |
| 0  | 0  |                  |                      |

FIG. 22A

DEVELOPMENT METHOD OF 16 COLORS IN CD GRAPHICS

| 0 | 1 | 2 | 3 |
|---|---|---|---|
| 4 | 5 | 6 | 7 |
| 8 | 9 | 10 | 11 |
| 12 | 13 | 14 | 15 |

PIXEL VALUES TO BE DEVELOPED

FIG. 22B

| 0000 | 0001 | 0010 | 0011 |
|------|------|------|------|
| 0100 | 0101 | 0110 | 0111 |
| 1000 | 1001 | 1010 | 1011 |
| 1100 | 1101 | 1110 | 1111 |

BINARY NOTATION OF PIXEL VALUES TO BE DEVELOPED

FIG. 23A

FIRST WRITE FONT INSTRUCTION
Color 0 = 0 (0000)
Color 1 = 1 (0001)

| 0 | 1 | 1 | 1 |
|---|---|---|---|
| 0 | 1 | 1 | 1 |
| 0 | 1 | 1 | 1 |
| 0 | 1 | 1 | 1 |

PIXEL VALUES AFTER WRITE FONT INSTRUCTION

| 0 | 1 | 1 | 1 |
|---|---|---|---|
| 0 | 1 | 1 | 1 |
| 0 | 1 | 1 | 1 |
| 0 | 1 | 1 | 1 |

BINARY NOTATION OF PIXEL VALUES AFTER WRITE FONT INSTRUCTION

| 0000 | 0001 | 0001 | 0001 |
|------|------|------|------|
| 0000 | 0001 | 0001 | 0001 |
| 0000 | 0001 | 0001 | 0001 |
| 0000 | 0001 | 0001 | 0001 |

FIG. 23B

EX-OR FONT INSTRUCTION
Color 0 = 0 (0000)
Color 1 = 2 (0010)

| 0 | 1 | 1 | 1 |
|---|---|---|---|
| 0 | 1 | 1 | 1 |
| 0 | 1 | 1 | 1 |
| 0 | 1 | 1 | 1 |

PIXEL VALUES AFTER EX-OR FONT INSTRUCTION

| 0 | 1 | 2 | 3 |
|---|---|---|---|
| 0 | 1 | 2 | 3 |
| 0 | 1 | 2 | 3 |
| 0 | 1 | 2 | 3 |

BINARY NOTATION OF PIXEL VALUES AFTER EX-OR FONT INSTRUCTION

| 0000 | 0001 | 0010 | 0011 |
|------|------|------|------|
| 0000 | 0001 | 0010 | 0011 |
| 0000 | 0001 | 0010 | 0011 |
| 0000 | 0001 | 0010 | 0011 |

FIG. 23C

EX-OR FONT INSTRUCTION
Color 0 = 0 (0000)
Color 1 = 4 (0100)

| 0 | 0 | 0 | 0 |
|---|---|---|---|
| 1 | 1 | 1 | 1 |
| 0 | 0 | 0 | 0 |
| 1 | 1 | 1 | 1 |

PIXEL VALUES AFTER EX-OR FONT INSTRUCTION

| 0 | 1 | 2 | 3 |
|---|---|---|---|
| 4 | 5 | 6 | 7 |
| 0 | 1 | 2 | 3 |
| 4 | 5 | 6 | 7 |

BINARY NOTATION OF PIXEL VALUES AFTER EX-OR FONT INSTRUCTION

| 0000 | 0001 | 0010 | 0011 |
|------|------|------|------|
| 0100 | 0101 | 0110 | 0111 |
| 0000 | 0001 | 0010 | 0011 |
| 0100 | 0101 | 0110 | 0111 |

FIG. 23D

EX-OR FONT INSTRUCTION
Color 0 = 0 (0000)
Color 1 = 8 (1000)

| 0 | 0 | 0 | 0 |
|---|---|---|---|
| 0 | 0 | 0 | 0 |
| 1 | 1 | 1 | 1 |
| 1 | 1 | 1 | 1 |

PIXEL VALUES AFTER EX-OR FONT INSTRUCTION

| 0 | 1 | 2 | 3 |
|---|---|---|---|
| 4 | 5 | 6 | 7 |
| 8 | 9 | 10 | 11 |
| 12 | 13 | 14 | 15 |

BINARY NOTATION OF PIXEL VALUES AFTER EX-OR FONT INSTRUCTION

| 0000 | 0001 | 0010 | 0011 |
|------|------|------|------|
| 0100 | 0101 | 0110 | 0111 |
| 1000 | 1001 | 1010 | 1011 |
| 1100 | 1101 | 1110 | 1111 |

IMAGE DISPLAY APPARATUS FOR PROCESSING GRAPHICS INSTRUCTIONS FROM A STORAGE DEVICE

BACKGROUND OF THE INVENTION

1. Field of the Invention

This invention relates to an image display apparatus displaying images reproduced from compact disc graphics (CD-G) including compact disc extended graphics (CD-EG).

2. Prior Art

Generally, CD graphics belong to technologies of recording image data in an area of subcodes R through W (6 bits) which is the unused area of the audio CD. These image data, although completely independent of audio data, can be read out together with audio data so as to realize the graphic display in synchronism with playback of audio sounds. The most representative use of such CD graphics is karaoke equipments (entertainment devices for providing accompaniment to let users sing and enjoy a luxury atmosphere like a professional singer). Unexamined Japanese patent application No. 2-226296/1990 discloses a technology relating to such CD graphics.

FIG. 6 shows a conventional CD graphics image processing apparatus. A compact disc (CD) drive 1, controlled by a drive control unit 6, reproduces audio data together with subcode data of a music program designated by a user (i.e. a control command entered into the drive control unit 6). The subcode data read out by the CD drive 1 are supplied to a control module 2 to analyze the detailed content of subcodes R through W. When a command for CD graphics (i.e. CDG command) is involved, subsequently read out information is the subcode data succeeding this command which is recorded in a predetermined format so as to represent data required for display. Then, graphic image information is developed or described in a display VRAM (i.e. display video RAM) 3 based on readout subcode data for display. The graphic image information developed in the VRAM 3 is then supplied to a display circuit 4, wherein the data is converted into video signals to be supplied to a display unit 5.

However, as well as other audio apparatuses, the playback/display apparatuses using CD graphics are generally required to have functions of "PAUSE" and "PAUSE RELEASE" of playback operation in response to user's manipulation through buttons or the like. Furthermore, accuracy is required in a function of resuming the playback operation from the interrupted position. More specifically, the information read out from the CD graphics is in a form of sequential frame data F1, F2, F3, F4, F5, - - -, as shown in FIG. 7A. For example, these frame data F1, F2, F3, F4, F5, - - - represent characters "A", "B", "C", "D", "E", - - -, respectively. It is now assumed that the playback operation is interrupted immediately after the frame data F2 has just processed in response to a "PAUSE" command, and thereafter the playback operation resumes in response to a "PAUSE RELEASE" command. If the playback operation is executed accurately (without any errors), the frame data reproduced immediately after an input of "PAUSE RELEASE" command is the frame data F3 which is continuous to the last frame data F2 in the previous playback operation before the "PAUSE" command is generated (refer to FIG. 7B and FIG. 8A).

However, there is a possibility that the playback operation may be executed erroneously as shown in FIGS. 7C and 7D, wherein FIG. 7C shows a discontinuous playback with undesirable skip of some frame data while FIG. 7D shows a discontinuous playback with undesirable repetition of some frame data.

If the data to be reproduced is sound signals only, discontinuity of playback sounds immediately before "PAUSE" and immediately after "PAUSE RELEASE" will not be a serious problem. But in the case that image signals are reproduced, discontinuity of image signals will cause a significant problem. For example, in the case of FIG. 7C playback operation, important image data F3 and F4 are missing on a display screen as shown in FIG. 8B. On the other hand, FIG. 7D playback operation will be defective in that frame data F1 and F2 are undesirably and repetitively displayed.

The existing CD drive apparatuses, used by the public are not yet satisfactory in that accuracy of subcodes is not sufficiently guaranteed. Furthermore, the playback/display apparatuses using CD graphics, having been already merchandised, are still in a level that their display screens are possibly disturbed by interrupt and/or resume processing in response to each "PAUSE" or "PAUSE RELEASE" command.

By the way, when a given playback apparatus is a type that reproduces CD graphic data by using an ordinary hardware device, the video signals sent out from the hardware device after accomplishing development processing of image data to an external device are in analog form. Hence, if a user wants to record these CDG image data, he will be required to use an ordinary video recorder or a computer equipped with a video signal fetch device.

In this case, if there are no purposes other than recording, ordinary video recorders will be able to satisfy the user's requirements. However, if the user wants to fetch the CDG image data again from the video recorder to a computer, it will become necessary to convert these CDG image signals from analog to digital form, which doubtlessly requires additional hardware and software for recording and editing digital data, such as a special fetch device for video signals. Furthermore, the image quality of the fetched video signals will be worsened because the video signals need to be converted from digital to analog before finally reconverted into digital form.

In general, instructions of CD graphics need to be reproduced every 1/300 second at maximum. If the hardware is of a type having a poor ability in processing graphics data or a general-purpose computer, it will require a long time to process each instruction, which possibly exceeds the above 1/300 second interval.

If the processing of CD graphics is delayed, reproduction of graphic image data will not meet the reproduction of corresponding audio data. Thus, the karaoke equipment employing such CD graphics display apparatus will fail to reproduce the words (displayed words on a screen) in synchronism with the music.

Hereinafter, processing of various instructions read out from the CD graphics will be explained with reference to FIGS. 22A–22B, 23A–23D and 24.

As shown in FIG. 24, a FONT constituted by 6×12 dots (pixels) is a unit section of the displayed screen and is displayable 16 colors (4 bits). To display the image of 16 colors, 2-color development (or description) is first performed according to the Write Font instruction, and then an EX-OR operation is performed with respect to every two colors according to the EX-OR Font instruction, thereby replacing predetermined pixels with desired color numbers.

For the purpose of simplifying the explanation, FIGS. 22A and 22B show a FONT as being constituted by 4×4 dots having pixel values "0" (=0000) through "15" (=1111).

First of all, as shown in FIG. 23A, two pixel values "0" and "1" (=0001) are developed or described in two areas according to the first instruction (i.e. Write Font instruction).

Then, as shown in FIG. 23B, two pixel values "0" and "2" (=0010) are developed or described in two areas according to the second instruction (i.e. EX-OR FONT instruction), thereby developing or describing pixel values "0" through "3" (=0011).

Subsequently, as shown in FIG. 23C, two pixel values "0" and "4" (=0100) are developed or described in two areas according to the third instruction (i.e. EX-OR FONT instruction), thereby developing or describing pixel values "0" through "7" (=0111).

Finally, as shown in FIG. 23D, two pixel values "0" and "8" (=1000) are developed or described in two areas according to the fourth instruction (i.e. EX-OR FONT instruction), thereby developing or describing pixel values "0" through "15" (=1111).

Accordingly, in order to develop or describe a desired color arrangement at an intended FONT, a plurality of instructions (Write Font instruction and EX-OR Font instruction) need to be processed. In other words, the color image processing utilizing CD graphics tends to be redundant.

Processing of other instructions will be explained below. Many of CD graphics softwares available in the market comprise numerous multi-recorded instructions, such as Preset Memory instruction, Preset Border instruction, and Load CLUT (Color Look Up Table) instruction. The Preset Memory instruction is used for fully coloring one screen by a designated color in order to prevent the screen from being disturbed by an irregular starting of playback operation from an intermediate portion of the track, for example, due to skip processing, or by lack of some data lost by error. The Preset Border instruction is used for fully coloring the border region. The Load CLUT instruction is used to change the color arrangement of the color palette.

If the hardware does not have a sufficient ability of speedily processing these multi-recorded instructions, it will possibly cause serious delay between sound and displayed image.

Furthermore, there are known two instructions for designating the method of CDG scroll processing. One scroll instruction relates to a method of designating an offset of a display start address of a present graphic display VRAM, which is originally designed for a system including a dedicated VRAM and a hardware such as an address counter. More specifically, an offset can be specified in the range of 0-11 dots (PV) in an up-and-down direction and 0-5 dots (PH) in a right-and-left direction. By designating the offset, the graphic image in the VRAM can be scrolled on an actual screen (CRT) of the display unit. This method is generally referred to as a dot units scroll.

The other scroll instruction relates to a method of shifting an actual image data in increment of 12 (vertical)×6 (horizontal) units. In this case, the image data are transferred in the VRAM by block transfer or the like. This method is referred to as a character units scroll.

In an ordinary CD graphics, these kinds of scroll instructions are reproduced at an interval of 1/300 second at maximum. When one complete screen is continuously scrolled in a lateral direction, a total of consecutive 300 scroll processing will be required. Accordingly, if the hardware or computer does not have sufficient speed to process these graphic data, the image actually displayed on a screen will be delayed in response to each scroll instruction.

SUMMARY OF THE INVENTION

Accordingly, in view of above-described problems encountered in the prior art, one object of the present invention is to provide an image display apparatus capable of preventing the display screen image from being disturbed by interruption and/or resumption in response to "PAUSE" and "PAUSE RELEASE" commands in the display of CD graphics including CD-G and CD-EG.

Another object of the present invention is to provide an image display apparatus capable of reproducing graphic image data from CD, developing or describing these graphic image data in a VRAM, and transferring these graphic image data of digital form to other devices.

Still another object of the present invention is to provide an image display apparatus capable of displaying graphic image even if a system does not have a sufficient ability of processing redundant instructions of CD graphics.

In order to accomplish these and other related objects, a first aspect of the present invention provides an image display apparatus processing graphics instructions stored in a compact disc, the apparatus comprising: drive means for interrupting a playback operation of the compact disc in response to a pause command, and resuming the playback operation in response to a pause release command so as to resume the playback operation a predetermined time earlier than a position where the playback operation is interrupted; reading means for reading out subcode data including the instructions from the compact disc; memory means for memorizing time information of an instruction finally processed before the playback operation is interrupted, the time information being involved in the subcode data read out from the compact disc; control means for canceling a processing of instructions immediately after the playback operation is resumed until continuity is recognized between time information of a newly entered instruction and the time information of the finally processed instruction memorized in the memory means; and display means for displaying image based on instructions processed by the control means.

In short, the first aspect of the present invention is characterized by memorizing the time information processed immediately before the "PAUSE" operation, and performing the graphics processing and the development processing only when the time information of each data successively entered after release of "PAUSE" condition is continuous to the memorized time information, otherwise canceling the graphic processing and the development processing. Thus, the first aspect of the present invention can prevent the display screen image from being disturbed due to interruption by "PAUSE" and "PAUSE RELEASE" operation.

A second aspect of the present invention provides an image display apparatus processing graphics instructions stored in a compact disc, the apparatus comprising: memory means for developing image on the basis of graphics instructions represented by subcode data read out from the compact disc; and format conversion means for converting a format of digital data representing the image memorized in the memory means into another format fitting to another system, the digital data being transferred to an external device.

A third aspect of the present invention provides an image display apparatus processing graphics instructions stored in a compact disc, the apparatus comprising: memory means for developing image on the basis of graphic instructions represented by subcode data read out from the compact disc; format conversion means for converting a format of digital data representing the image memorized in the memory means into another format fitting to another system, the digital data being transferred to an external device; and time administration means for commanding the format conversion means to transfer the digital data to the external device at predetermined intervals.

Accordingly, the second and third aspects of the present invention enable an external memory device to memorize the images of CD graphics as perfect static or dynamic images (animation) of digital form.

A fourth aspect of the present invention provides an image display apparatus processing graphics instructions stored in a compact disc, the apparatus comprising: first memory means for memorizing subcode data read out from the compact disc, the subcode data including a plurality of graphics instructions; second memory means for developing image data on the basis of the instructions represented by the subcode data memorized in the first memory means; video RAM for receiving the image data developed in the second memory means when transferred from the second memory means, and memorizing the image data for display on a screen; control means for canceling a transfer of image data from the second memory means to the video RAM when a presently processed instruction and a succeeding instruction are identical to each other in that both instructions are either Write Font instruction or EX-OR Font instruction having the same position and same channel, and for executing the transfer of image data from the second memory means to the video RAM when the presently processed instruction is different from the succeeding instruction; and display means for displaying image data memorized in the video RAM.

Accordingly, the fourth aspect of the present invention omits or cancels the processing of the Write Font instruction and the EX-OR Font instruction when the position and the channel are identical between successive instructions. Thus, it is preferably applied to a CD graphic display apparatus having a poor ability in the data processing.

A fifth aspect of the present invention provides an image display apparatus processing graphics instructions stored in a compact disc, the apparatus comprising: memory means for memorizing color data presently displayed on a screen; control means for comparing color information of a newly entered instruction with the color data memorized in the memory means, when the newly entered instruction is any of Preset Memory instruction, Preset Border instruction, and Load CLUT instruction, and for canceling a processing of the newly entered instruction when the color information of the newly entered instruction is identical with the color data memorized in the memory means; and display means for displaying image based on instructions processed by the control means.

In this manner, the fifth aspect of the present invention adequately omits the processing of the newly entered Preset Memory/Border instructions or the Load CLUT instruction when the color conditions are the same as those of the previous one. It is advantageous when the CD graphic display apparatus has a poor ability in the data processing.

A sixth aspect of the present invention provides an image display apparatus processing graphics instructions stored in a compact disc, the apparatus comprising: judging means for making a judgement, when a newly entered instruction is either Soft Scroll Screen with Preset instruction or Soft Scroll Screen with Copy instruction, as to whether or not a designated scroll dot number of the newly entered instruction is smaller than a predetermined number; and control means for canceling a processing of the newly entered instruction when the judging means judges that the designated scroll dot number is smaller than the predetermined number.

A seventh aspect of the present invention provides an image display apparatus processing graphics instructions stored in a compact disc, the apparatus comprising: judging means for making a judgement, when a newly entered instruction is either Soft Scroll Screen with Preset instruction or Soft Scroll Screen with Copy instruction, as to whether the newly entered instruction designates a dot units scroll or a character units scroll; and control means for canceling a processing of the newly entered instruction when the judging means judges that the newly entered instruction designates the dot units scroll, and executing the processing of the newly entered instruction when the judging means judges that the newly entered instruction designates the character units scroll.

In short, the sixth and seventh aspects of the present invention omit or cancel the processing of the Soft Scroll Screen with Preset instruction or the Soft Scroll Screen with Copy instruction when the scroll amount is smaller than a predetermined value. Thus, the delay of display due to lack of data processing ability will be sufficiently eliminated, which is advantageous when the CD graphic display apparatus has a poor ability in the data processing.

BRIEF DESCRIPTION OF THE DRAWINGS

The above and other objects, features and advantages of the present invention will become more apparent from the following detailed description which is to be read in conjunction with the accompanying drawings, in which:

FIG. 10 is a view showing a format of one pack;

FIG. 13 is a view illustrating one example of CDG instructions stored in a data storage buffer shown in FIG. 11;

FIG. 14 is a view illustrating another example of CDG instructions stored in the data storage buffer shown in FIG. 11;

FIG. 17 is a view illustrating one example of CDG instructions read out in the fourth embodiment of the present invention;

FIG. 20 is a view showing a 2- or 3-dot units scroll processing in accordance with the fifth embodiment of the present invention;

FIG. 21 is a view showing another scroll processing based on character units in accordance with the fifth embodiment of the present invention;

FIGS. 22A, 22B, 23A, 23B, 23C and 23D are views illustrating a method of developing 16 colors.

DETAILED DESCRIPTION OF THE PREFERRED EMBODIMENTS

Figure 1:
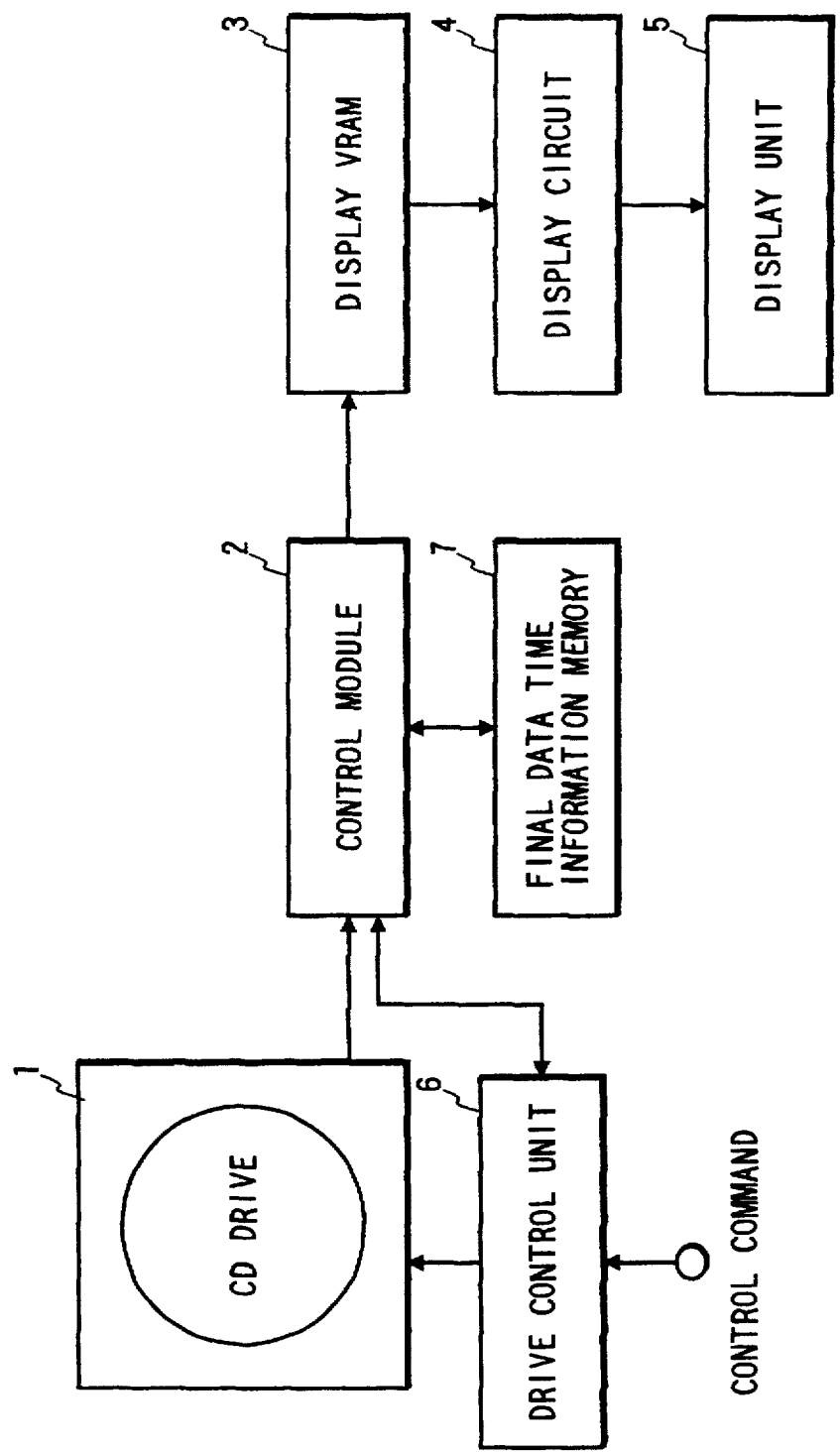
FIG. 1 is a schematic block diagram showing an arrangement of an image display apparatus in accordance with a first embodiment of the present invention.

Preferred embodiments of the present invention will be explained in greater detail hereinafter, with reference to the accompanying drawings. Identical parts are denoted by identical reference numeral throughout views.

First Embodiment

Figure 2:
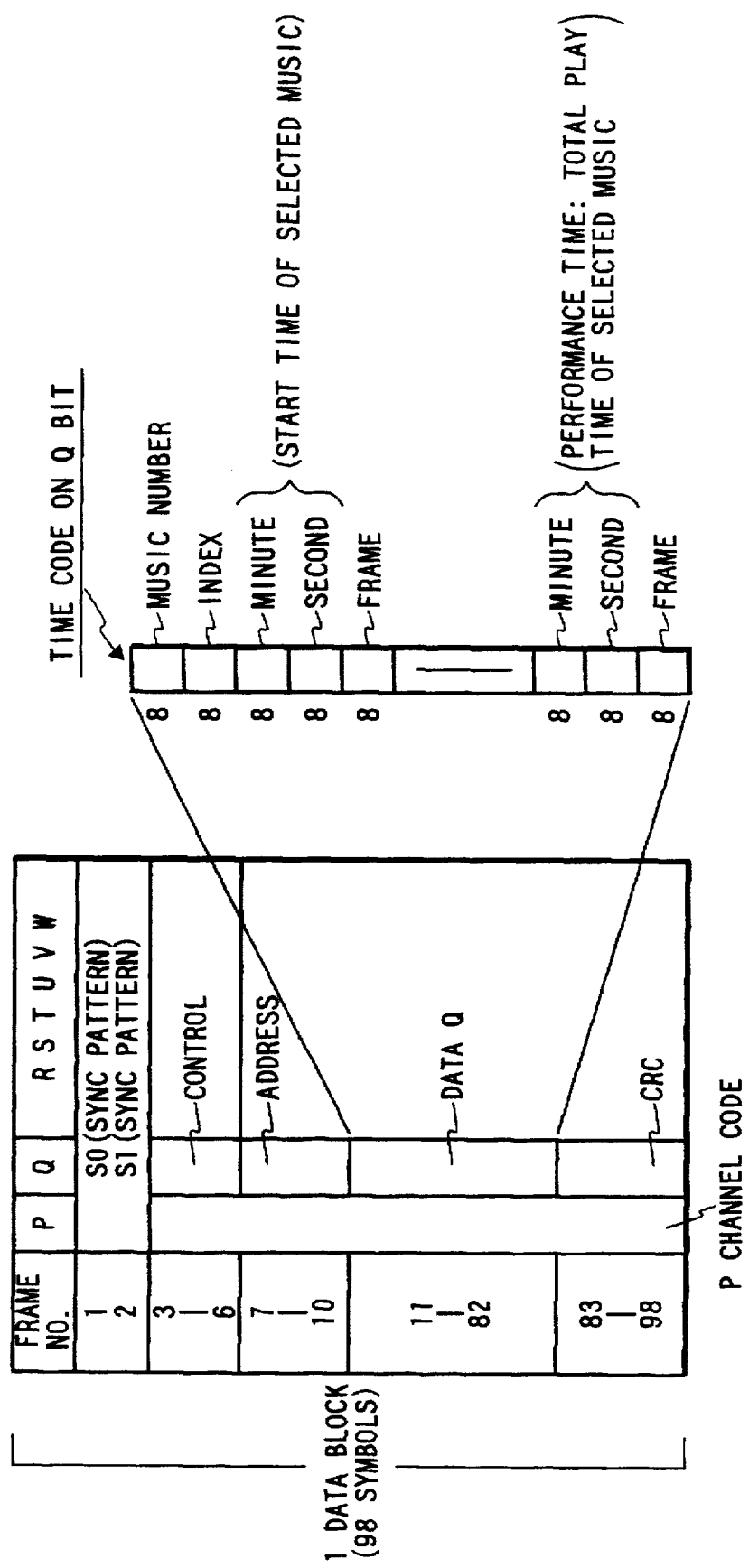
FIG. 2 is a view illustrating a format for arranging subcodes of CD graphics.
Figure 3:
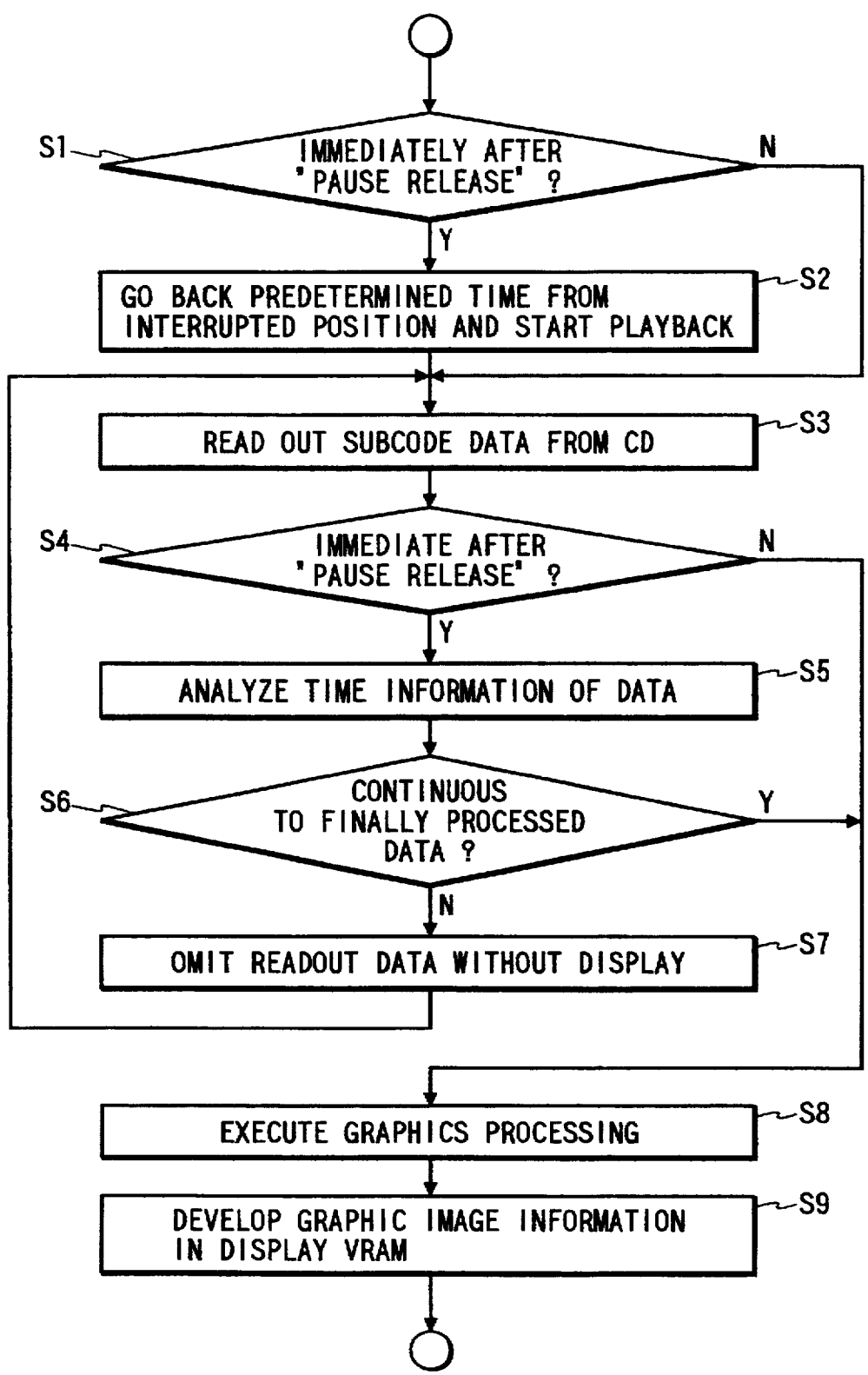
FIG. 3 is a flow chart illustrating an operation of the image display apparatus in accordance with the first embodiment of the present invention.

FIG. 1 is a schematic block diagram showing an arrangement of an image display apparatus in accordance with a first embodiment of the present invention. FIG. 2 is a view illustrating a format for arranging subcodes of CD graphics. And, FIG. 3 is a flow chart illustrating an operation of the image display apparatus in accordance with the first embodiment of the present invention.

First of all, referring to FIG. 2, the format of subcodes of compact disc (CD) graphics will be explained. One data block, EFM demodulated from the CD graphics, is constituted by a total of 98 symbols, whose first and second frames are sync patterns while third through 98th frames are 8-bit data containing P through W channel codes. Among them, P and Q channel codes are referred to as time codes. P channel code of third to 98th frames are used for quick search of an intended program.

The Q channel code is constituted by several fields, a control field consisting of third through sixth frames, an address field consisting of seventh through tenth frames, a data Q field consisting of 11th through 82nd frames (a total of 72 bits), and a CRC field consisting of 83rd through 98th frames. The data Q field of 72 bits can record numerous data in units of 8 bits, for example, a music number, an index, a start time of a selected music (time of music) and a performance time of the same (a total play time from the start of the music) both being expressed in units of minute and second in accordance with a read-in track and a read-out track (during a play of music), and a frame number.

Accordingly, it is possible to detect a time from the beginning of the disc based on the performance time (total play time from the start of the music) which is reproduced in response to the read-out track (during a play of music). Furthermore, the time thus detected enables us to identify a position on the disc in terms of an absolute time.

Figure 9:
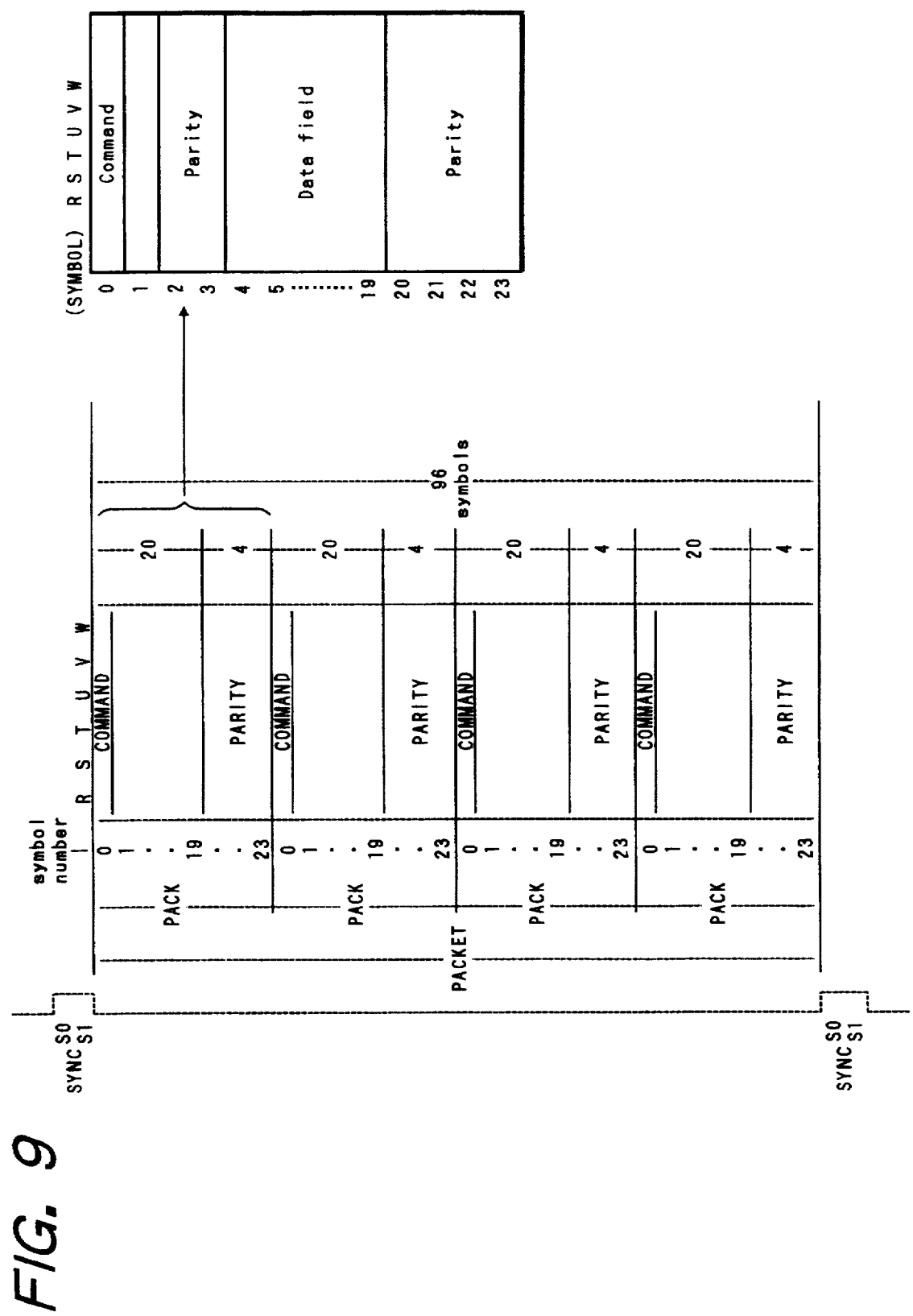
FIG. 9 is a view showing an arrangement of one packet.

As shown in FIG. 9, the fields defined by R–W channel codes (6 bits) of the third through 98th frames (96 frames or symbols) is referred to as one packet, which comprises a total of four packs (one pack is constituted by 96/4=24 symbols). Each pack is formatted in the following manner (refer to FIG. 10).

Symbol 0 - - - mode (3 bits)+item (3 bits)
Symbol 1 - - - instruction
Symbols 2–3 - - - parities
Symbols 4–19 - - - data field
Symbols 20–23 - - - parities In the CD graphics, the symbol 0 is a CDG command [001001] (=9; [001] (mode)+[001] item). The symbol 1 will comprise the following instructions:

[000001] (=1): Preset Memory
[000010] (=2): Preset Border
[000110] (=6): Write Font
[010100] (=20): Soft Scroll Screen with Preset
[011000] (=24): Soft Scroll Screen with Copy
[011110] (=30): Load CLUT 0 Colors 0–7
[011111] (=31): Load CLUT 1 Colors 8–15
[100110] (=38): EX-OR Font with 2 colors The data field of the fourth through 19th symbols is differentiated in accordance with each instruction, so that the graphic image is displayed on the basis of this instruction and information in the data field. Details of instructions is, for example, disclosed in the so-called "Red Book" of Phillips Co. Ltd., May 1991, or in the Transistor Technology, page 397–404, October 1992.

Next, with reference to FIGS. 1 through 3, the arrangement and operation of the first embodiment will be explained.

FIG. 1 shows a CD graphics image processing apparatus. A compact disc (CD) drive 1, controlled by a drive control unit 6, reproduces audio data together with subcode data of a music program designated by a user (i.e. a control command entered into the drive control unit 6). The subcode data read out by the CD drive 1 is supplied to a control module 2 to analyze the detailed content of subcodes R through W. When a command for CD graphics (i.e. CDG command) is involved, subsequently read out information is the subcode data succeeding this command which is recorded in a predetermined format so as to represent information required for display. The readout subcode data (information) for display is first developed or described in a display VRAM (i.e. display video RAM) 3 as graphic image information in the form of digital data. The graphic image information developed or described on the VRAM 3 is then supplied to a display circuit 4, wherein the graphic data is converted into video signals to be supplied to a display unit 5.

In this first embodiment, the control module 2 is connected to a final data time information memory 7. This final data time information memory 7 memorizes time information contained in the subcodes read out from the CD graphics.

In the playback operation, a control command for instructing a start of playback, the start position and the like, is first entered into the drive control unit 6. The drive control unit 6 controls the CD drive 1 in response to the control command so that the data of CD graphics can be reproduced from a designated position. The control module 2 analyzes the content of subcodes formatted as shown in FIG. 2. When the CDG command is involved, the display VRAM 3 develops or describes graphic image information on the basis of the instruction and succeeding data involved in the subcodes. The graphic image information developed on the VRAM 3 is supplied to the display circuit 4 and converted into the video signals and then displayed on the screen of the display unit 5.

More specifically, the control module 2 checks in a step S1 whether or not a "PAUSE RELEASE" command is generated shortly before. During an ordinary playback operation the judgement becomes "NO" in the step S1, therefore the control module 2 skips a step S2 and proceeds to a step S3, wherein the subcode data are read out from the CD graphics. Thereafter, the control module 2 proceeds to a step S4 to check again whether or not the "PAUSE RELEASE" command is generated shortly before. When the playback operation still goes ordinarily, the judgement becomes "NO" in the step S4 and therefore the control module 2 directly proceeds to a step S8 to execute a graphic processing, and subsequently goes to a step S9 to develop or describe graphic image information in the display VRAM 3.

If a user enters a "PAUSE" command into the drive control unit 6, the drive control unit 6 causes the CD drive 1 to pause in response to this command. The CD drive 1 maintains the pause condition until a "PAUSE RELEASE" command is entered to cancel the pause condition. At the same time, the drive control unit 6 notifies the control module 2 of reception of the "PAUSE" command. When this "PAUSE" command is received, the control module 2 decodes a performance time (a total play time from the start of music) stored in the data Q field of the subcodes processed finally, and memorizes the thus decoded time information into the final data time information memory 7.

Meanwhile, if the "PAUSE RELEASE" command is entered into the drive control unit 6, the drive control unit 6 notifies the control module 2 of reception of the "PAUSE RELEASE" command. Immediately after the control module 2 received the "PAUSE RELEASE" command, the judgement in the step S1 becomes "YES" and accordingly the control module 2 proceeds to the step S2 to make the drive control unit 6 actuate the CD driver 1 to resume the playback operation at a predetermined time earlier than the interrupted position.

Thus, the control module 2 reads out the same subcodes in the step S3 as those already read out in the previous playback operation before the "PAUSE" command in entered. As the playback operation has just resumed shortly before, the judgement in the step S4 becomes "YES" and therefore the control module 2 proceeds to a step S5 to analyze the time information of data successively entered after the "PAUSE RELEASE" command is generated by comparing each time data of the readout data with the time data memorized in the final data time information memory 7.

Then, the control module 2 makes a judgement in a step S6 as to whether the presently readout data is continuous to the finally processed data, which is processed latest in the playback operation having been performed before generation of the "PAUSE" command. If the presently readout data is not continuous to the finally processed data (i.e. "NO" in the step S6), the control module 2 proceeds to a step S7 to omit the readout data without performing any of graphics processing and developing or describing processing of image data into the display VRAM 3, and then returns to the step S3 to repeat the procedure of steps S4–S6. On the other hand, if the presently readout data is continuous to the finally processed data (i.e. "YES" in the step S6), the control module 2 proceeds to the steps S8 and S9 to perform the graphics processing and the development (description) processing.

In short, the first embodiment of the present invention is characterized by memorizing the time data contained in the data Q field of the subcodes finally processed immediately before the "PAUSE" operation, and performing the graphics processing and the development processing only when the time information of each data successively entered after release of "PAUSE" condition is continuous to the memorized time information, otherwise canceling the graphic processing and the development processing. Thus, the first embodiment of the present invention can prevent the display screen image from being disturbed due to interruption by "PAUSE" operation.

The time going back at the resumption of the playback operation after release of the "PAUSE" condition should be determined depending on accuracy of the CD drive 1.

Second Embodiment

Next, a second embodiment of the present invention will be explained, with reference to FIG. 4 diagram showing a schematic arrangement of a CD graphics image processing apparatus in accordance with the second embodiment of the present invention. The second embodiment comprises an internal memory 8, a format conversion module 9, and an external memory device 10.

Figure 4:
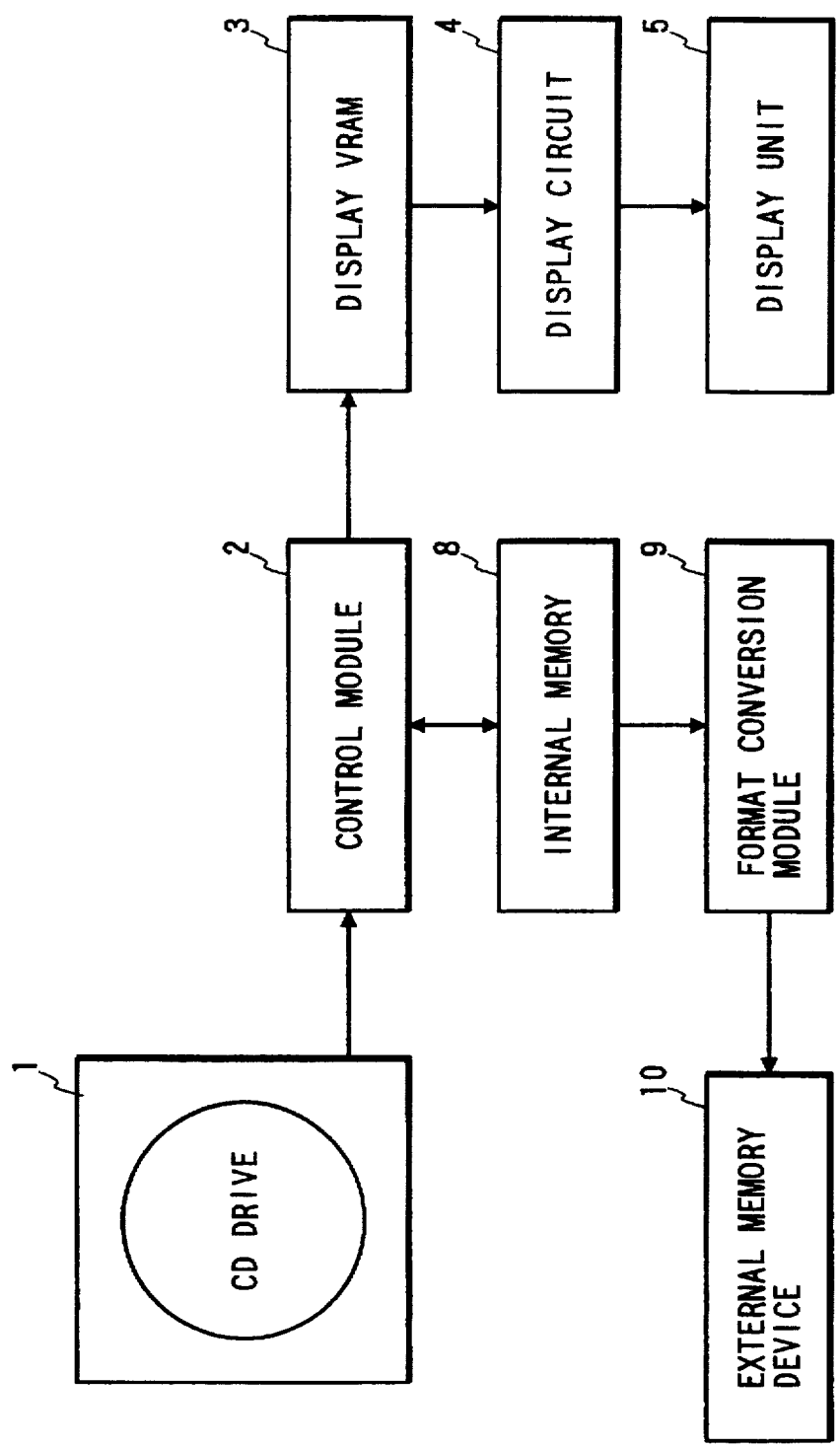
FIG. 4 is a schematic block diagram showing an arrangement of an image display apparatus in accordance with a second embodiment of the present invention.

In FIG. 4, the CD drive 1 reproduces audio data together with subcode data of a music program designated by a user. The subcode data read out by the CD drive 1 is supplied to the control module 2 to analyze the detailed content of subcodes R through W. When a command for CD graphics (i.e. CDG command) is involved, the subcode data recorded in the format shown in FIG. 2, succeeding this command, is read out. Then, the internal memory 8 develops or describes the graphic image information on the basis of the instruction and succeeding data. The graphic image information developed or described in the internal memory 8, as digital data, is transferred into the display VRAM 3 and then transferred into the display circuit 4 wherein the graphic data is converted into video signals to be displayed on the display unit 5.

In this second embodiment, if an external request is entered during the playback operation or the predetermined conditions (time, graphics content etc.) are satisfied, the graphic image information developed or described in the internal memory 8 is transferred into the external memory device 10. In this transferring operation of graphic image data from the internal memory 8 to the external memory device 10, the graphic image data is once entered into the format conversion module 9 to convert the format of graphic image data into a designated format fitting to an intended system, such as a personal computer, which operates and handles graphic image data on an own image editing software. Thus, provision of the format conversion module 9 makes it easy to perform secondary edition of graphic data or else in the opponent system utilizing the external memory device 10.

As an alternative method of reading out the graphic data, it will be possible to omit the internal memory 8 and directly access the VRAM 3 in the case that the control module 2 can easily access the VRAM 3.

Figure 5:
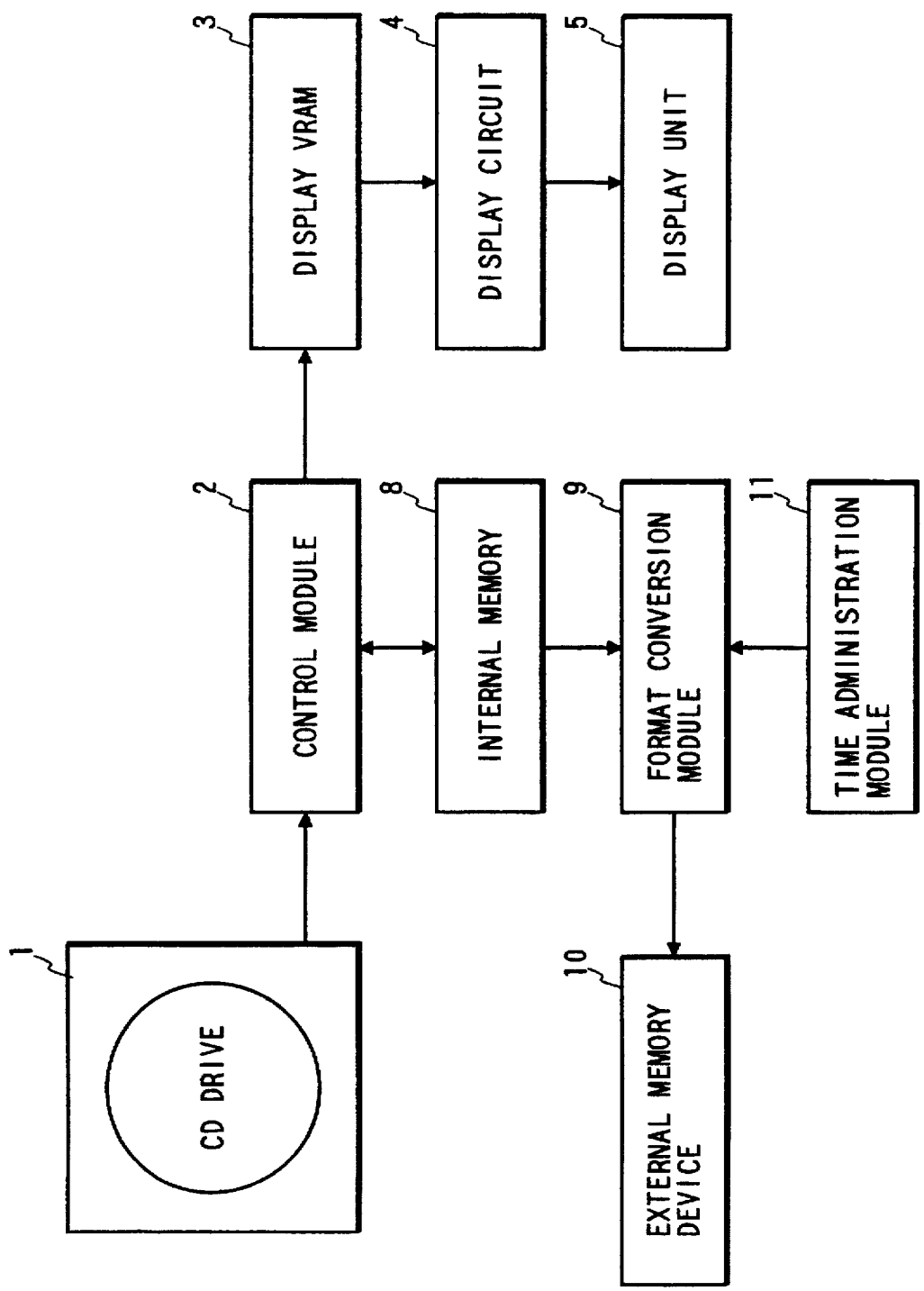
FIG. 5 is a schematic block diagram showing an arrangement of a modified image display apparatus of the second embodiment of the present invention.
Figure 6:
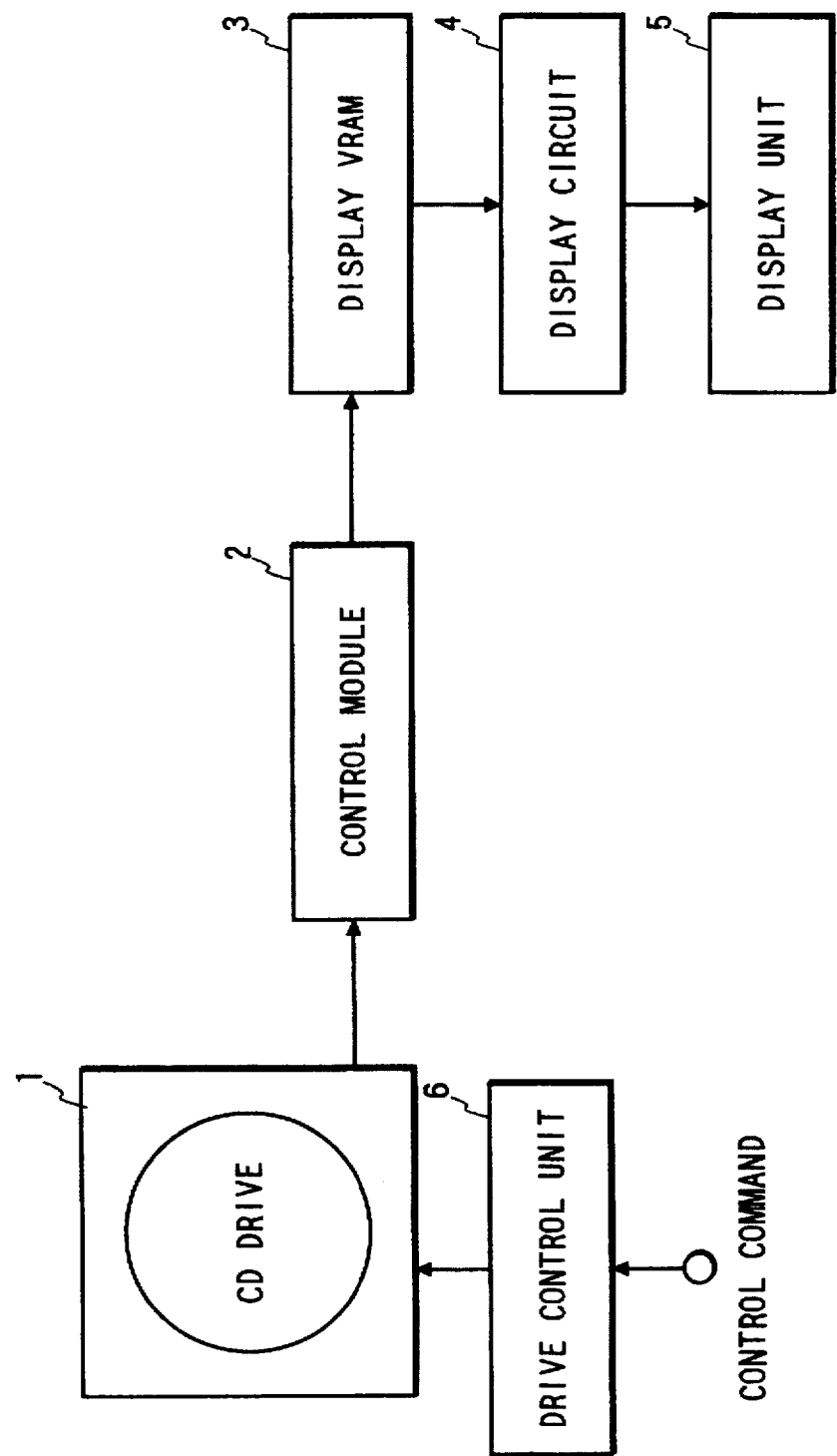
FIG. 6 is a schematic block diagram showing a conventional image display apparatus.
Figure 7A:
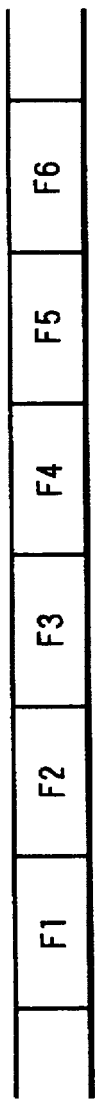
FIGS. 7A to 7D are views illustrating continuity and discontinuity of CDG data, possibly caused in response to "PAUSE" and "PAUSE RELEASE" commands.
Figure 7B:
Figure 7C:
Figure 7D:
Figure 8A:
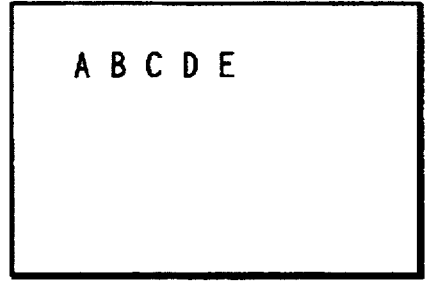
FIGS. 8A to 8C are views illustrating effect of the continuity and discontinuity of CDG data on the display screen image.
Figure 8B:
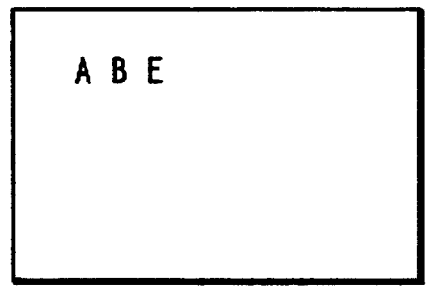
Figure 8C:
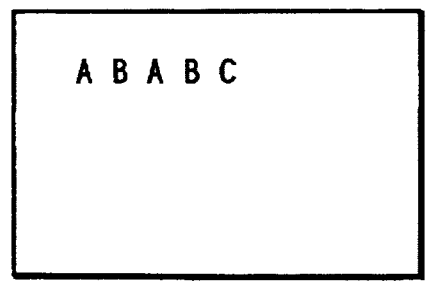

FIG. 5 shows a modified embodiment of the second embodiment which is different from the second embodiment in that a time administration module 11 is connected to the format conversion module 9. The second embodiment is characterized in that the timing of the transferring operation of the graphic data is occasional and therefore the graphic image received by the external memory device 10 is a static image. However, there will be a demand for memorizing the graphic image data as dynamic images (animation). To realize this, the modified embodiment of the second embodiment provides the time administration module 11. More specifically, the time administration module 11 sends a transfer command to the format conversion module 9 every predetermined intervals. Hence, the format conversion module 9 transfers the graphic data whose format is adequately converted to the external memory device 10 at predetermined intervals, thereby memorizing graphic data as dynamic images (animation). In addition to the graphic data, the external memory device 10 receives time data relating to a data fetch interval and a fetch time.

Accordingly, the modified embodiment of the present invention enables the external memory device 10 to memorize the images of CD graphics as perfect digital dynamic images. In this case, it will be possible to let the format conversion module 9 compress the digital graphic data or vary the size and color information thereof.

Although the FIG. 5 embodiment discloses the time administration module 11 as a block being separately provided, it will be possible to provide the time administration module 11 as part of the control module 2 or the format conversion module 9. Furthermore, as described previously, the internal memory 8 can be omitted when the control module 2 can easily access the VRAM 3.

Still further, in the FIG. 4 and 5 embodiments, the external memory device 10 can be an SCSI or a general-purpose memory device based on serial connection. The display unit 5 itself can be a monitor display unit of a personal computer. In such a case, their memory or hard disk will be available as a memory device for this invention, as long as the graphic data is transferred from the format conversion module 9 to the external memory device 10.

As explained above, the second embodiment of the present invention provides format conversion means for converting the format of digitized graphic data into a format fitting to an intended system. And, the modified second embodiment of the present invention provides time administration means, in addition to the format conversion means, for supplying the format conversion means with a transfer command instructing the transfer of graphic image information at predetermined intervals. Therefore, it becomes possible to memorize the graphic image information reproduced from the CD graphics as digital data in appropriate memory means or to flexibly transfer the same to other devices.

Third Embodiment

Next, an arrangement of the data field of the fourth through 19th symbols in each instruction will be explained in more detail.

First of all, the Preset Memory instruction (=1) has the following data field arrangement.

4 symbol=0, 0+Color No. (4 bits)
5 symbol=0, 0+Repeat (4 bits)
6–#19 symbols=0, 0, 0, 0, 0, 0

The Preset Border instruction (=2) has the following data field arrangement.

4 symbol=0, 0+Color No. (4 bits)
5–#19 symbols=0, 0, 0, 0, 0, 0

The Write Font instruction (=6) and the EX-OR Font instruction (=38) has the same data field arrangement as follows.

4 symbol=CH0 (2 bits)+Color 0 (Color No.: 4 bits)
5 symbol=CH1 (2 bits)+Color 1 (Color No.: 4 bits)
6 symbol=0+Row address (5 bits)
7 symbol=Column address (6 bits)
8–#19 symbols=Font data (6 bits)

The Soft Scroll Screen with Preset instruction (=20) has the following data field.

4 symbol=0, 0,+Color No. (4 bits)
5 symbol=Horizontal shift direction (2 bits)+0+ Horizontal shift pointer (3 bits)
6 symbol=Vertical shift direction (2 bits) +Vertical shift pointer (4 bits)
7–#19 symbols=0, 0, 0, 0, 0, 0

The Soft Scroll Screen with Copy instruction (=24) has the following data field.

4 symbol=0, 0, 0, 0, 0, 0
5 symbol=Horizontal shift direction (2 bits)+0+ Horizontal shift pointer (3 bits)
6 symbol=Vertical shift direction (2 bits) +Vertical shift pointer (4 bits)
7–#19 symbols=0, 0, 0, 0, 0, 0

The Load CLUT 0 instruction (=30) has a data field representing colors 0–7, while the Load CLUT 1 instruction (=31) has a data field representing colors 8–15. Each color includes RGB data, each being represented by 4 bits, requiring a total of 12 bits (=2 symbols).

Next, arrangement and operation of the third embodiment of the present invention will be explained with reference to FIGS. 11 and 12.

Figure 11:
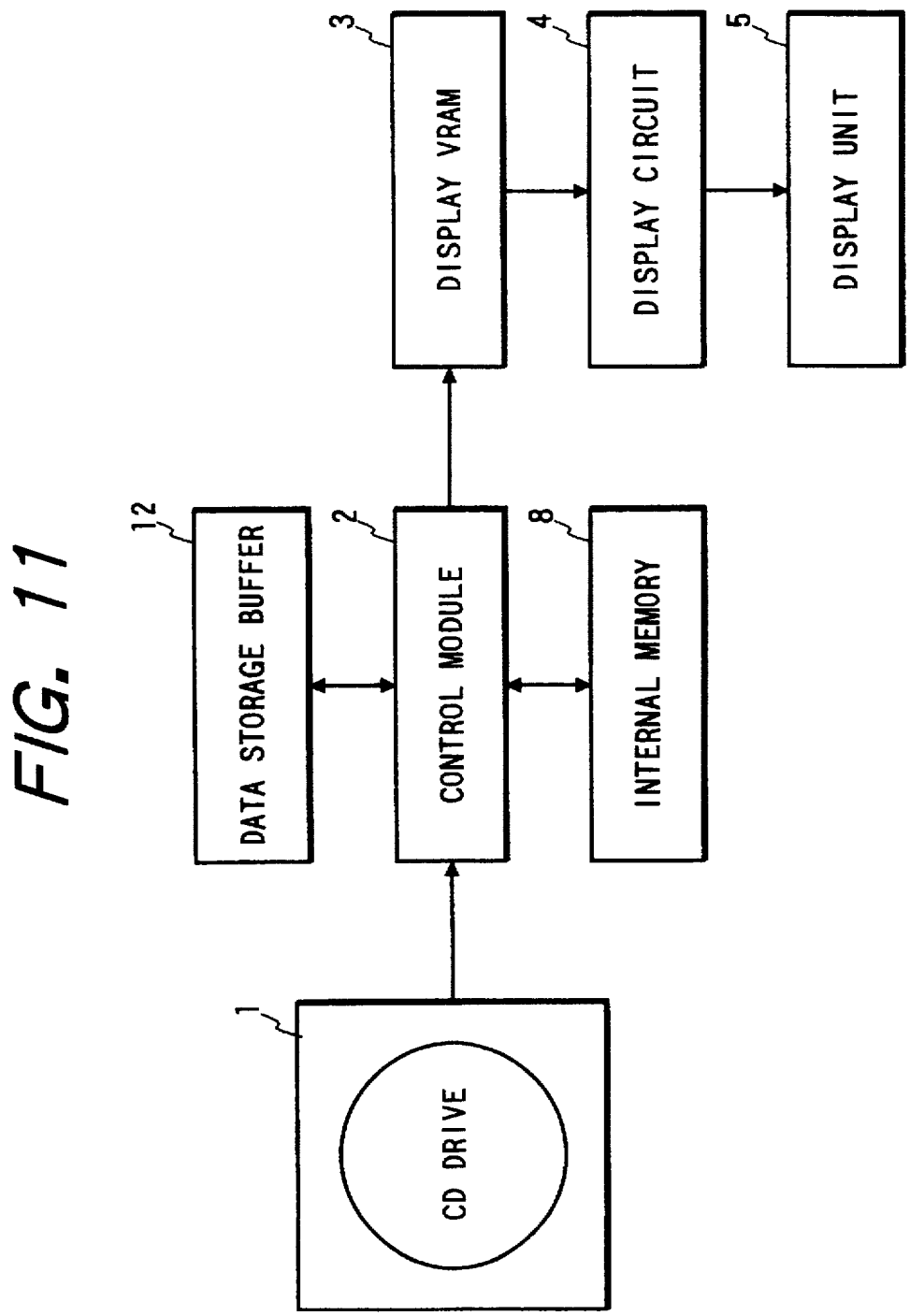
FIG. 11 is a schematic block diagram showing an arrangement of an image display apparatus in accordance with a third embodiment of the present invention.

FIG. 11 shows a CD graphics image processing apparatus in accordance with the third embodiment of the present invention. In FIG. 11, the CD drive 1 reproduces audio data together with subcode data of a music program designated by a user. The subcode data read out by the CD drive 1 is supplied to the control module 2 to analyze the detailed content of subcodes R through W. When a command for CD graphics (i.e. CDG command) is involved, the subcode data recorded in the format shown in FIG. 2, succeeding this command, is read out. Then, the internal memory 8 develops or describes the graphic image information on the basis of the instruction and succeeding data. The graphic image information developed in the internal memory 8, as digital data, is transferred into the display VRAM 3 and then sent to the display circuit 4 wherein the graphic data is converted into video signals to be displayed on the display unit 5. Furthermore, the third embodiment CD graphics image processing apparatus comprises a data storage buffer 12 which is connected to the control module 2 to temporarily store the subcode data read out from the CD graphics by the CD drive 1.

Figure 12:
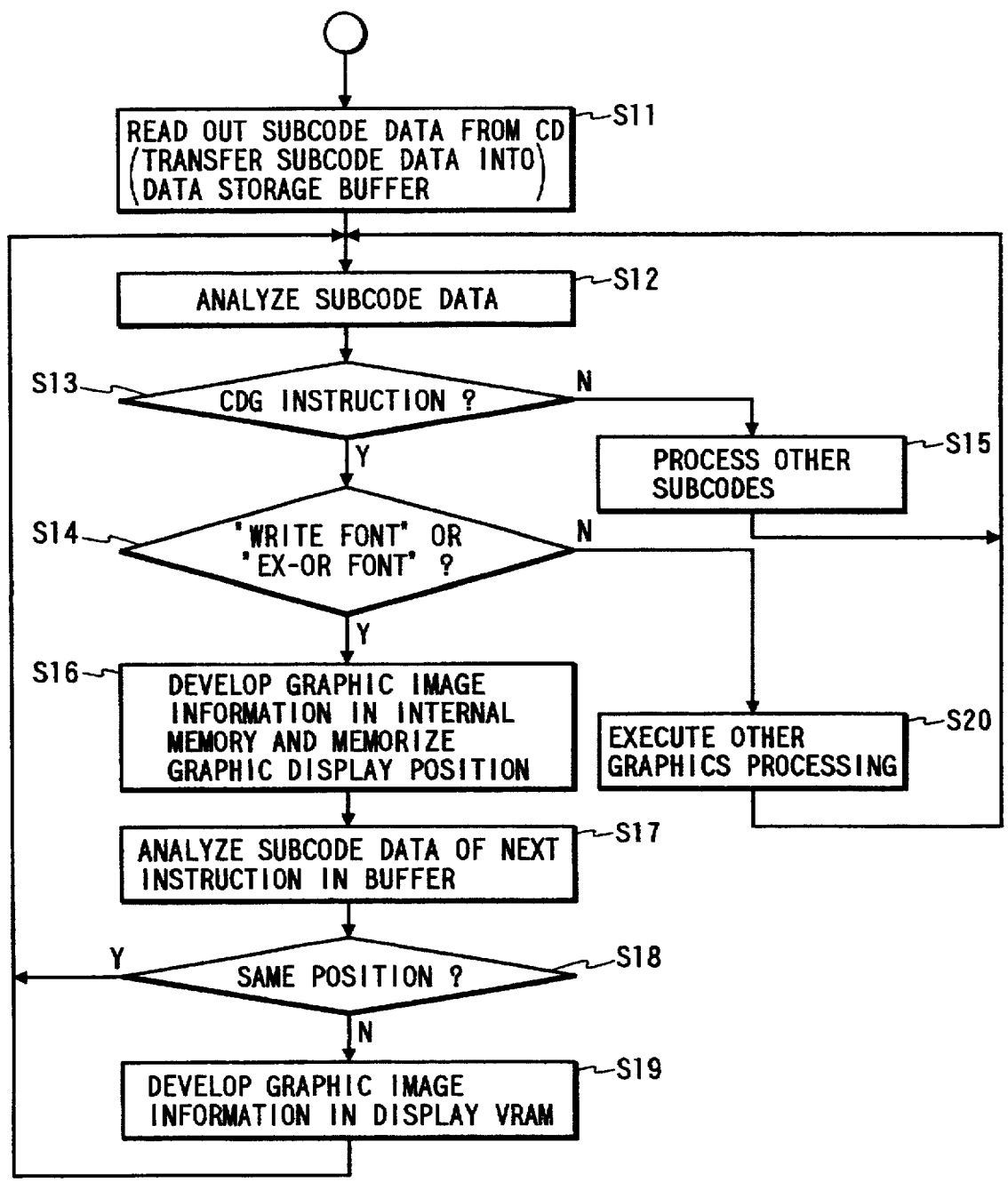
FIG. 12 is a flow chart illustrating an operation of the image display apparatus in accordance with the third embodiment of the present invention.

More specifically, in a step S11 of FIG. 12 flow chart, the control module 2 reads out a plurality of subcode data from the CD graphics through the CD drive 1 and transfers the readout data into the data storage buffer 12. Then, in a step S12, the control module 2 analyzes the content of the subcode data stored in the data storage buffer 12. Subsequently, the control module 2 checks in a step S13 as to whether or not a command for CD graphics (i.e. CDG command) is involved. When no CDG command is involved, the control module 2 proceeds to a step S15 to process other subcodes, and then returns to the step S12.

On the other hand, when the CDG command is included, the control module 2 proceeds to a step S14 to make a judgement as to whether the Write Font instruction or the Ex-OR Font instruction is included. If none of the Write Font instruction and the Ex-OR Font instruction is found ("NO" in the step S14), the control module 2 proceeds to a step S20 to execute other graphics processing according to the readout instruction, and then returns to the step S12.

If either the Write Font instruction or the Ex-OR Font instruction is detected ("YES" in the step S14), the control module 2 proceeds to a step S16 to read out the data of symbols succeeding this instruction, develop or describe graphic image information in the internal memory 8, and memorize the display position.

Thereafter, the control module 2 analyzes the content of the subcode data of the next instruction stored in the data storage buffer 12. Then, the control module 2 checks in a step S18 as to whether or not the next instruction has the same Write Font instruction or EX-OR Font instruction in position and channel as those of the present instruction. If the next instruction has the same Write Font instruction or EX-OR Font instruction in position and channel as those of the present instruction ("YES" in the step S18), the control module 2 returns to the step S12 without executing the development (or description) processing. On the contrary, when the next instruction is not the same Write Font instruction or EX-OR Font instruction in position and channel as the present instruction ("NO" in the step S18), the control module 2 proceeds to a step S19 to transfer the graphic image information developed in the internal memory 8 to the display VRAM 3, and then returns to the step S12. The graphic image information (digital data) in the VRAM 3 is next supplied to the display circuit 4, wherein the data is converted into video signals, and then sent to the display unit 5 to display the resultant image.

Hereinafter, the third embodiment of the present invention will be explained in more detail with reference to FIG. 13.

According to the example shown in FIG. 13, the first address "t" of the data storage buffer 12 stores the following graphic image information.

09: CDG command
06: Write Font instruction
XX, XX: Parities
R1: Row address
C1: Column address
ch 1: channel
, , **, - - - : data Meanwhile, the next address "t+1" of the data storage buffer 12 stores the following graphic image information.

09: CDG command
38: EX-OR Font instruction
XX, XX: Parities
R1: Row address
C1: Column address
ch 1: channel
, , **, - - - : data In such a case, the Write Font instruction of the buffer address "t" is identical with the EX-OR Font instruction of the buffer address "t+1" in the position (the same Row address and the same Column address) and the channel (the same channel ch1). Hence, the processing for transferring the graphic image information from the internal memory 8 into the display VRAM 3 is canceled (not executed). On the other hand, when the instruction of the buffer address "t+1" is different from the Write Font instruction or the EX-OR Font instruction, or when the Write Font instruction or the EX-OR Font instruction of the buffer address "t" is not identical with those of the buffer address "t+1" in their position and channel, the graphic image information is transferred from the internal memory 8 into the display VRAM 3.

Although the example of FIG. 13 compares the graphic image information between consecutive two instructions (addressed "t" and "t+1"), it is needless to say that the comparison can be performed among a plurality of addresses more than two.

FIG. 14 shows another example of a data storage buffer storing a total of four instructions.

According to the example shown in FIG. 14, the first address "t" of the data storage buffer 12 stores the following graphic image information.

09: CDG command
06: Write Font instruction
XX, XX: Parities
R1: Row address
C1: Column address
ch 1: channel
, , **, - - - : data Meanwhile, the next address "t+1" of the data storage buffer 12 stores the following graphic image information.

09: CDG command
06: Write Font instruction
XX, XX: Parities
R1: Row address
C1: Column address
ch 2: channel
, , **, - - - : data When two instructions stored in the addresses "t" and "t+1" are compared, these instructions are identical to each other in that both are Write Font instructions having the same position (R1, C1) but are different each other in their channels (ch 1 and ch 2). Accordingly, this comparison is neglected.

On the other hand, the third address "t+2" of the data storage buffer 12 stores the following graphic image information.

09: CDG command
02: Preset Border instruction
XX, XX: Parities
, , **, - - - : data Namely, the instruction stored in the third address "t+2" is not relevant to the Write Font instruction or the EX-OR Font instruction. Thus, the comparison between the first and third instructions is neglected.

Furthermore, the fourth address "t+3" of the data storage buffer 12 stores the following graphic image information.

09: CDG command
38: EX-OR Font instruction
XX, XX: Parities
R1: Row address
C1: Column address
ch 1: channel
, , **, - - - : data When two instructions stored in the addresses "t" and "t+3" are compared, these instructions satisfy the condition of the step S14 of the FIG. 12 flow chart (i.e. a concerned instruction is either the Write Font instruction or the EX-OR Font instruction), and are identical each other in having the same position (R1, C1) and the same channel (ch 1). Accordingly, this comparison result is checked by the control module 2 (steps S17 and S18 of the FIG. 12 flow chart). And, thus, no graphic image data is transferred into the display VRAM 3 in the processing of the Write Font instruction corresponding to the buffer address "t".

In short, the transferring operation of the graphic image information into the display VRAM 3 is omitted or canceled only when any two instructions among the buffer addresses "t" through "t+3" are either the Write Font instruction or the EX-OR Font instruction having the same position and the same channel.

However, the presence of the Preset Memory instruction, the Soft Scroll Screen with Preset instruction, and the Soft Scroll Screen with Copy instruction will significantly affect the developed condition of the buffer address "t". Thus, the present embodiment nullifies the above procedure (steps S17 ad S18) and forcibly transfers the graphic image information into the display VRAM 3 whenever any one of the Preset Memory instruction, the Soft Scroll Screen with Preset instruction, and the Soft Scroll Screen with Copy instruction is interposed between two instructions being either the Write Font instruction or the EX-OR Font instruction even if these two instruction have the same position and the same channel.

The control procedure described above will be summarized in the following manner.

(1) Either Write Font or EX-OR Font (same position, same channel)→No graphic image information is transferred to VRAM 3

(2) Either Write Font or EX-OR Font (different position or channel)→Neglected (analyze next instruction)

(3) Preset Memory→Graphic image information is forcibly transferred to VRAM 3

(4) Preset Border→Neglected (analyze next instruction)

(5) Load CLUT 0–7→Neglected (analyze next instruction)

(6) Load CLUT 8–15→Neglected (analyze next instruction)

(7) Soft Scroll Screen with Preset→Graphic image information is forcibly transferred to VRAM 3

(8) Soft Scroll Screen with Copy→Graphic image information is forcibly transferred to VRAM 3

Accordingly, the third embodiment of the present invention omits or cancels the processing of the Write Font instruction and the EX-OR Font instruction when the position and the channel are identical between successive instructions. It is advantageous when the CD graphic display apparatus has a poor ability in the data processing.

Fourth Embodiment

Figure 15:
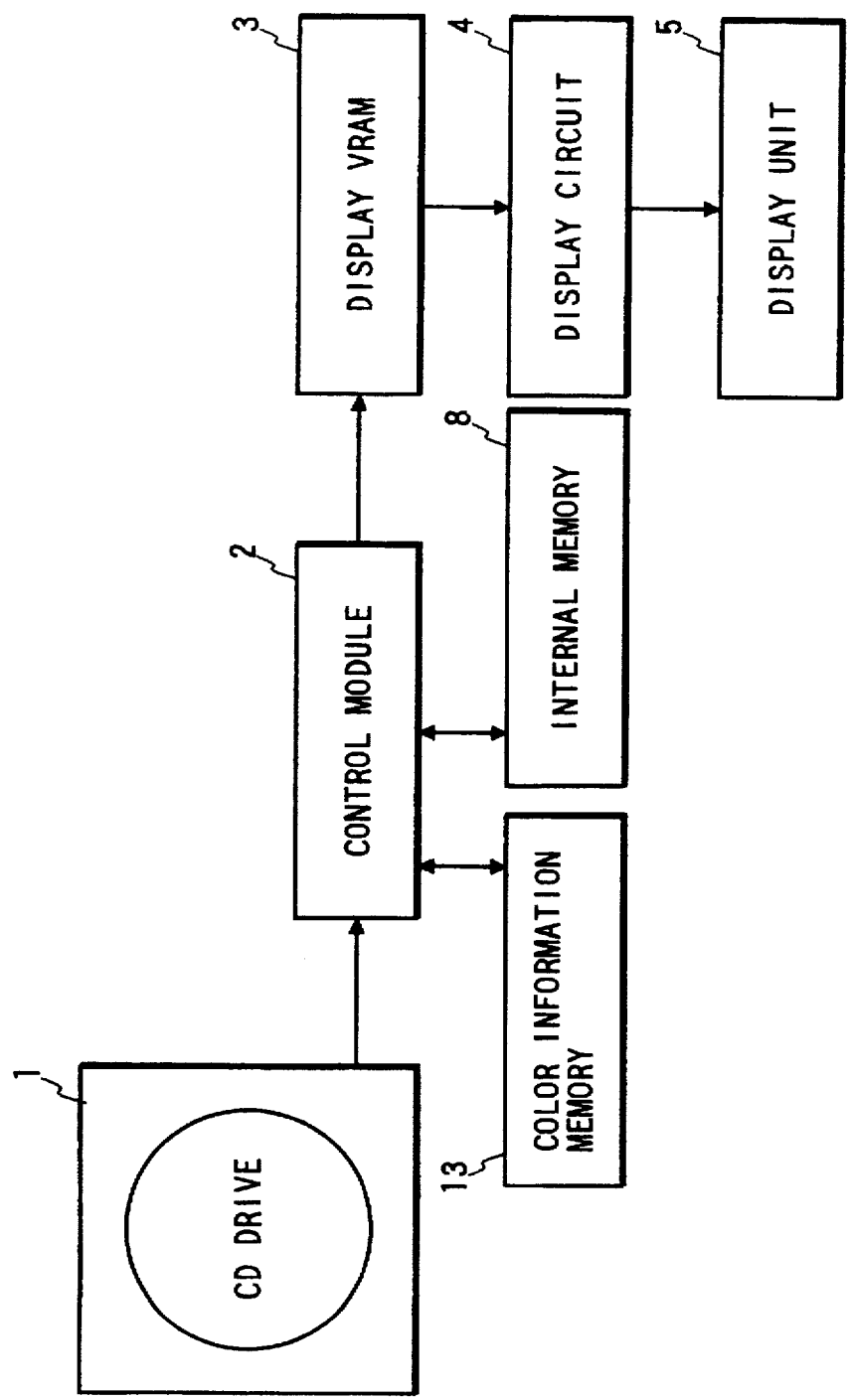
FIG. 15 is a schematic block diagram showing an arrangement of an image display apparatus in accordance with a fourth embodiment of the present invention.
Figure 16:
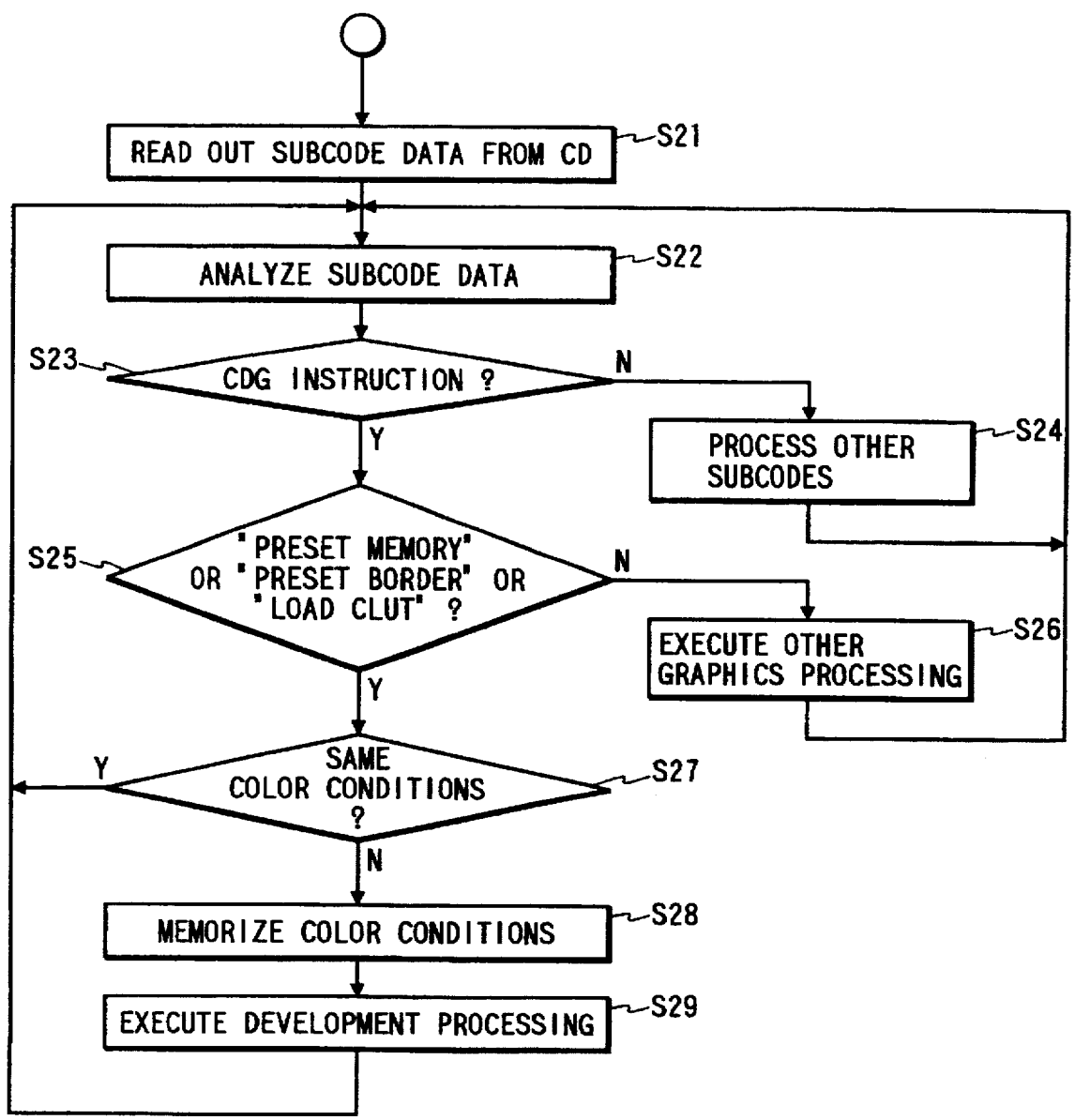
FIG. 16 is a flow chart illustrating an operation of the image display apparatus in accordance with the fourth embodiment of the present invention.

Next, with reference to FIGS. 15 through 17, a fourth embodiment of the present invention will be explained. FIG. 15 is a schematic block diagram showing an arrangement of a CD graphics image display apparatus in accordance with the fourth embodiment of the present invention. FIG. 16 is a flow chart illustrating an operation of the CD graphics image display apparatus in accordance with the fourth embodiment of the present invention. FIG. 17 is a view illustrating one example of CDG instructions read out in the fourth embodiment of the present invention. The fourth embodiment CD graphics image display apparatus is different from the third embodiment apparatus in that the data storage buffer 12 is replaced by a color information memory 13.

The arrangement and operation of the fourth embodiment will be explained with reference to FIGS. 15 and 16. In FIG. 15, the CD drive 1 reproduces audio data together with subcode data of a music program designated by a user. The subcode data read out by the CD drive 1 are supplied to the control module 2 to analyze the detailed content of subcodes R through W. When a command for CD graphics (i.e. CDG command) is involved, the subcode data recorded in the format shown in FIG. 2, succeeding this command, is read out. Then, the internal memory 8 develops or describes the graphic image information on the basis of the instruction and succeeding data. The graphic image information developed in the internal memory 8, as digital data, is transferred into the display VRAM 3 and then sent to the display circuit 4 wherein the graphic data is converted into video signals to be displayed on the display unit 5.

Furthermore, as mentioned above, the fourth embodiment CD graphics image processing apparatus comprises the color information memory 13 connected to the control module 2 to memorize the data of colors presently displayed, i.e. colors of the Preset Memory/Border instructions and CLUT values of the CLUT instruction in the latest processing.

More specifically, in a step S21 of FIG. 16 flow chart, the control module 2 reads out a plurality of subcode data from the CD graphics through the CD drive 1. Then, in a step S22, the control module 2 analyzes the content of the subcode data thus read out. Subsequently, the control module 2 checks in a step S23 as to whether or a command for CD graphics (i.e. CDG command) is involved. When no CDG command is involved, the control module 2 proceeds to a step S24 to process other subcodes, and then returns to the step S22.

On the other hand, when the CDG command is included, the control module 2 proceeds to a step S25 to make a judgement as to whether any of the Preset Memory instruction, the Preset Border instruction and the Load CLUT instruction are included. If none of the Preset Memory instruction, the Preset Border instruction and the Load CLUT instruction are found ("NO" in the step S25), the control module 2 proceeds to a step S26 to execute other graphics processing according to the readout instruction, and then returns to the step S22.

If any of the Preset Memory instruction, the Preset Border instruction and the Load CLUT instruction is detected ("YES" in the step S25), the control module 2 proceeds to a step S27 to make a judgement as to whether or not the color conditions of the readout instruction are the same as the presently displayed color conditions; namely, colors of Preset Memory/Border instructions and CLUT values of the Load CLUT instruction are compared between the readout instruction and the data memorized in the color information memory 13.

If the color conditions of the readout instruction are the same as the presently displayed color conditions ("YES" in the step S27), the control module 2 returns to the step S22 without processing the readout instruction. On the contrary, when the color conditions of the readout instruction are different from the presently displayed color conditions ("NO" in the step S27), the control module 2 proceeds to a step S28 to memorize or renew the content of the color information memory 13. Thereafter, the control module 2 proceeds to a step S29 to transfer the graphic image information developed or described in the internal memory 8 to the display VRAM 3, and then returns to the step S22. The graphic image information (digital data) in the VRAM 3 is next supplied to the display circuit 4, wherein the data are converted into video signals, and then sent to the display unit 5 to display the resultant image.

FIG. 17 shows one example of subcode data read out from the CD graphics. First of all, the content of the color information memory 13 is initialized in the following manner.

Developed color of Preset Memory instruction=0
Developed color of Preset Border instruction=0
Content of CLUT0=all 0
Content of CLUT1=all 0

When the readout subcode data are arranged in the addresses "t1" through "t14" as shown in FIG. 17, the following instructions are executed in response to data of addresses "t1" through "t4" as the color information memory 13 is initialized.

t1: Load CLUT0 instruction
t2: Load CLUT1 instruction
t3: Preset Memory instruction
t4: Preset Border instruction Thus, the color information memory 13 memorizes the content of "t1: Load CLUT0 instruction" (00, 00, 00, 01, 01, 01), the content of "t2: Load CLUT1 instruction" (08, 08, 08, 09, 09, 09), developed color of "t3: Preset Memory instruction" (01), and developed color of "t4: Preset Border instruction" (01).

Subsequently, at the address "t5", the Preset Memory instruction is newly entered. However, the data indicating the color condition is the same (01) as that of the already memorized Preset Memory instruction. Thus, this instruction is neglected. Similarly, the Preset Border instruction newly entered in the address "t6" has the same color condition (01) as that of the already memorized Preset Border instruction; therefore, this instruction is neglected too. However, the Preset Memory instruction newly entered in the address "t7" has a different color condition (02); thus, the procedure of the step 29 of FIG. 16 flow chart is performed to memorize the renewed color information (02) in the color information memory 13. Similarly, the Preset Border instruction newly entered in the address "t8" has a different color condition (02); thus, the renewed color information (02) is memorized in the color information memory 13.

Next, at the address "t9", the Load CLUT0 instruction is newly entered. However, the content of the instruction is the same (00, 00, 00, 01, 01, 01) as that of the already memorized Load CLUT 0 instruction. Thus, this instruction is neglected. Similarly, the Load CLUT 1 instruction newly entered in the address "t10" has the same content (08, 08, 08, 09, 09, 09) as that of the already memorized Load CLUT 1 instruction; therefore, this instruction is neglected too.

In this manner, the fourth embodiment of the present invention adequately omits the processing of the newly entered Preset Memory/Border instructions or the Load CLUT instruction when the color conditions are the same as those of the previous one. It is advantageous when the CD graphic display apparatus has a poor ability in the data processing.

Fifth embodiment

Figure 18:
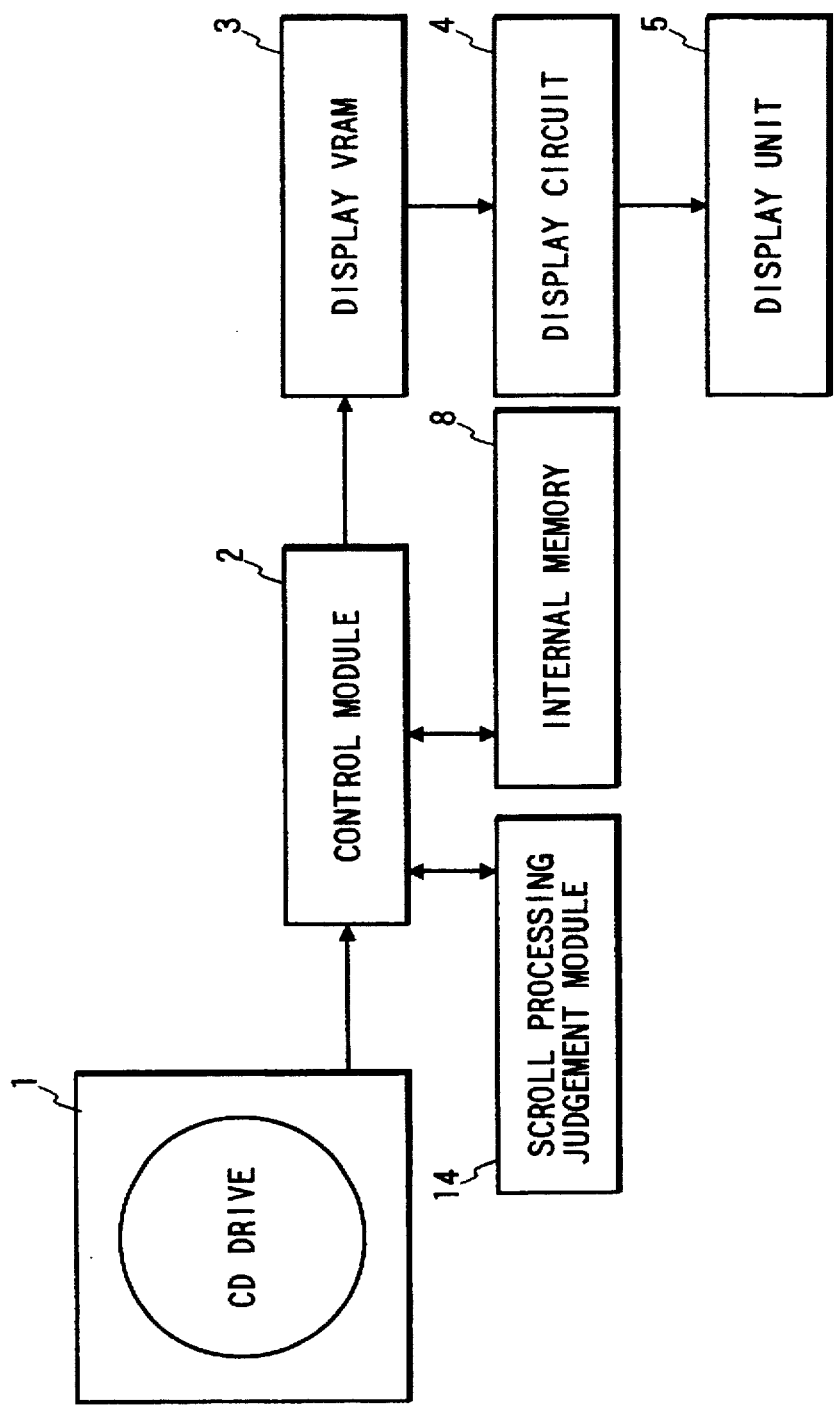
FIG. 18 is a schematic block diagram showing an arrangement of an image display apparatus in accordance with a fifth embodiment of the present invention.
Figure 19:
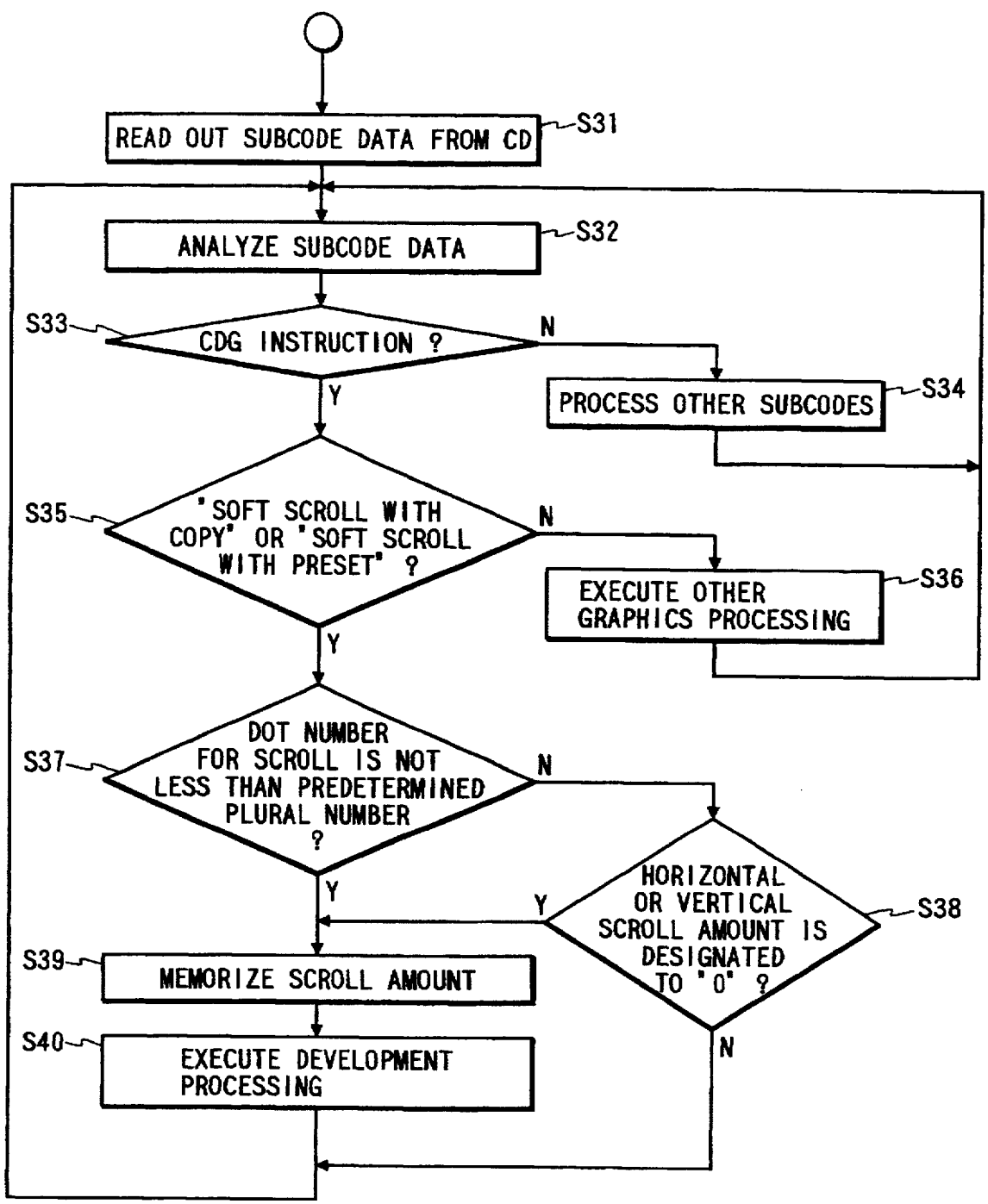
FIG. 19 is a flow chart illustrating an operation of the image display apparatus in accordance with the fifth embodiment of the present invention.
Figure 24:
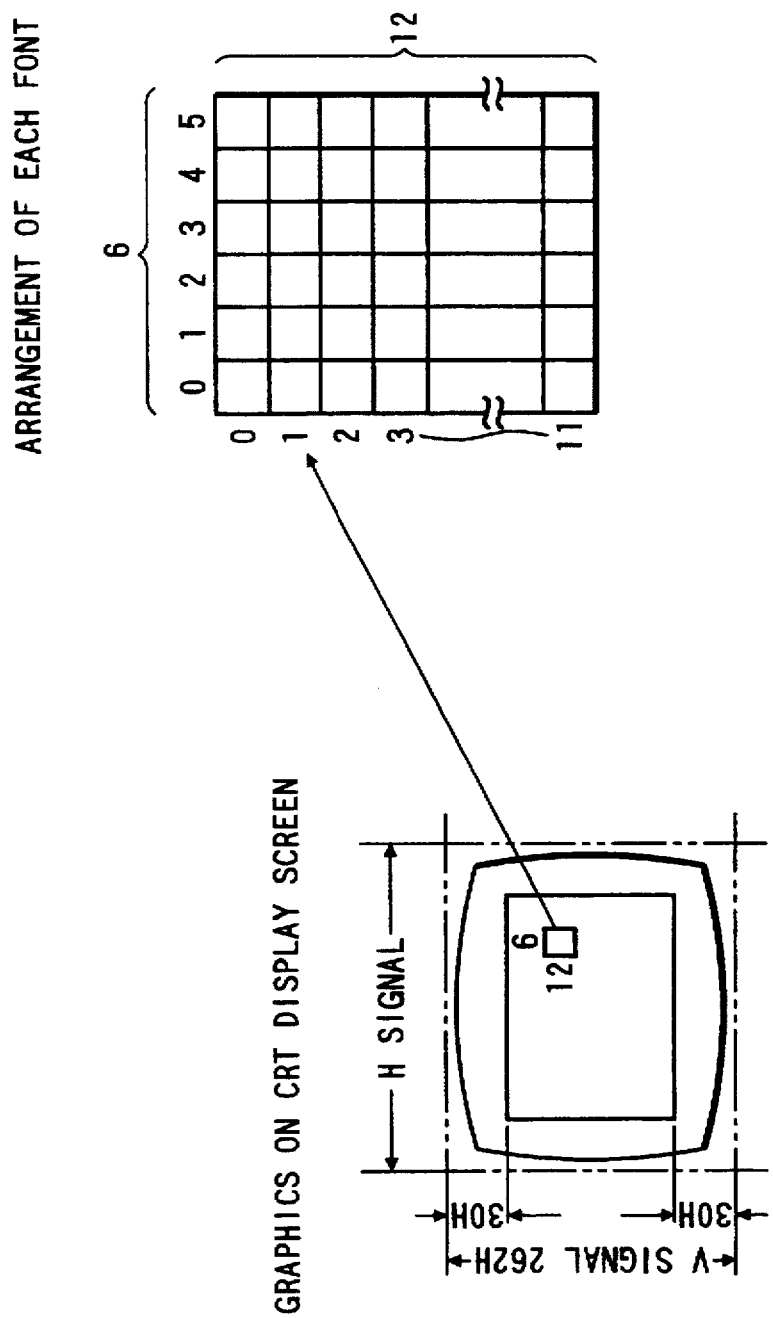
FIG. 24 is a view showing a FONT constituted by 6×12 pixels.

Next, with reference to FIGS. 18 through 21, a fifth embodiment of the present will be explained. FIG. 18 is a schematic block diagram showing an arrangement of a CD graphics image display apparatus in accordance with the fifth embodiment of the present invention. FIG. 19 is a flow chart illustrating an operation of the CD graphics image display apparatus in accordance with the fifth embodiment of the present invention. The fifth embodiment CD graphics image display apparatus is different from the third embodiment apparatus in that the data storage buffer 12 is replaced by a scroll processing judgement module 14.

The arrangement and operation of the fifth embodiment will be explained with reference to FIGS. 18 and 19. In FIG. 18, the CD drive 1 reproduces audio data together with subcode data of a music program designated by a user. The subcode data read out by the CD drive 1 is supplied to the control module 2 to analyze the detailed content of subcodes R through W. When a command for CD graphics (i.e. CDG command) is involved, the subcode data recorded in the format shown in FIG. 2, succeeding this command, is read out. Then, the internal memory 8 develops or describes the graphic image information on the basis of the instruction and succeeding data. The graphic image information developed in the internal memory 8, as digital data, is transferred into the display VRAM 3 and then sent to the display circuit 4 wherein the graphic data is converted into video signals to be displayed on the display unit 5.

Furthermore, as mentioned above, the fifth embodiment CD graphics image processing apparatus comprises the scroll processing judgement module 14 connected to the control module 2. The scroll processing judgement module 14 makes a judgement when the control module 2 processes a scroll instruction. More specifically, when the scroll instruction includes a scroll processing less than a predetermined number of dots, this scroll instruction is neglected. Otherwise, all the dot units scroll processing is neglected and only the character units scroll is executed.

That is, in a step S31 of FIG. 19 flow chart, the control module 2 reads out a plurality of subcode data from the CD graphics through the CD drive 1. Then, in a step S32, the control module 2 analyzes the content of the subcode data thus read out. Subsequently, the control module 2 checks in a step S33 as to whether or not a command for CD graphics (i.e. CDG command) is involved. When no CDG command is involved, the control module 2 proceeds to a step S34 to process other subcodes, and then returns to the step S32.

On the other hand, when the CDG command is included, the control module 2 proceeds to a step S35 to make a judgement as to whether either the Soft Scroll Screen with Copy instruction or the Soft Scroll Screen with Preset instruction is included. If none of the Soft Scroll Screen with Copy instruction and the Soft Scroll Screen with Preset instruction is found ("NO" in the step S35), the control module 2 proceeds to a step S36 to execute other graphics processing according to the readout instruction, and then returns to the step S32. If any of the Soft Scroll Screen with Copy instruction and the Soft Scroll Screen with Preset instruction is detected ("YES" in the step S35), the control module 2 proceeds to a step S37 to make a judgement as to whether or not the dot number for the scroll processing is not less than a predetermined plural dot number (e.g. 2 or 3).

More specifically, the control module 2 reads out the data relating to the dot units scroll and the data relating to the character units scroll, succeeding the Soft Scroll Screen with Copy instruction or the Soft Scroll Screen with Preset instruction, and sends these readout data to the scroll processing judgement module 14.

The scroll processing judgement module 14 detects the presence of the character units scroll information and the size of dot units scroll, on the basis of the readout data. When no character units scroll is detected and a dot units scroll is detected, the size of the designated dot units scroll is compared with the present scroll condition. If the amount of the designated dot units scroll is not smaller than the predetermined plural dot number ("YES" in the step S37), the control module 2 proceeds to a step S39 to memorize the designated scroll amount, and then proceeds to a step S40 to execute the development processing.

However, if the designated dot units scroll is smaller than the predetermined plural dot number ("No" in the step S37), the control module 2 proceeds to a step S38 to check whether a horizontal or vertical scroll amount is re-designated to "0". The designation of the horizontal or vertical scroll amount to "0" is equivalent to an initialization of scroll position; thus, the control module 2 forcibly executes the designated scroll operation regardless of the amount of scroll ("YES" in the step S38).

Meanwhile, when the character units scroll is detected, the present dot units scroll condition is initialized. Then, the scroll processing judgement module 14 checks whether the amount of the designated scroll is not less than a predetermined dot number. Subsequently, when the necessity of executing the scroll processing is recognized, a required shift amount is calculated. Then, thus obtained data are sent from the scroll processing judgement module 14 to the control module 2. The control module 2 thus executes the development processing based on the calculated shift amount (Step S40), and also memorizes the shift amount for judgement of the next scroll instruction (Step S39).

FIG. 20 is a view showing a 2- or 3-dot units scroll processing in accordance with the fifth embodiment of the present invention, while FIG. 21 is a view showing another scroll processing based on character units in accordance with the fifth embodiment of the present invention.

As apparent from FIG. 20, the present embodiment performs the scroll operation in units of 2 dots or 3 dos, whereas the conventional scroll operation is executed in increment of one dot. Thus, the delay of display due to lack of data processing ability will be sufficiently eliminated, although smoothness may be slightly lost.

In short, the fifth embodiment omits or cancels the processing of the Soft Scroll Screen with Preset instruction or the Soft Scroll Screen with Copy instruction when the scroll amount is smaller than a predetermined value. This is advantageous when the CD graphic display apparatus has a poor ability in the data processing.

As this invention may be embodied in several forms without departing from the spirit of essential characteristics thereof, the present embodiments as described are therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. An image display apparatus processing graphics instructions stored in a compact disc, said apparatus comprising:

judging means for making a judgement, when a new instruction from said compact disc is either a Soft Scroll Screen with Preset instruction or a Soft Scroll Screen with Copy instruction, as to whether or not a designated scroll dot number of said newly entered instruction is smaller than a predetermined number; and control means for canceling processing of said newly entered instruction when said judging means judges that said designated scroll dot number is smaller than said predetermined number.

2. An image display apparatus processing graphics instructions stored in a compact disc, said apparatus comprising:

judging means for making a judgement, when a new instruction from said compact disc is either a Soft Scroll Screen with Preset instruction or a Soft Scroll Screen with Scroll instruction, as to whether said newly entered instruction designates a dot units scroll or a character units scroll; and control means for canceling processing of said newly entered instruction when said judging means judges that said newly entered instruction designates the dot units scroll, and executing processing of said newly entered instruction when said judging means judges that said newly entered instruction designates the character units scroll.

3. A method of processing graphics instructions stored in a compact disc, comprising the steps of:

judging, when a new instruction from said compact disc is either a Soft Scroll Screen with Preset instruction or a Soft Scroll Screen with Copy instruction, as to whether or not a designated scroll dot number of said newly entered instruction is smaller than a predetermined number; and canceling processing of said newly entered instruction when it is judged that said designated scroll dot number is smaller than said predetermined number.

4. A method of processing graphics instructions stored in a compact disc, comprising the steps of:

judging, when a new instruction from said compact disc is either a Soft Scroll Screen with Preset instruction or a Soft Scroll Screen with Scroll instruction, as to whether said newly entered instruction designates a dot units scroll or a character units scroll; and canceling processing of said newly entered instruction when it is judged that said newly entered instruction designates the dot units scroll, and executing processing of said newly entered instruction when it is judged that said newly entered instruction designates the character units scroll.

5. The image display apparatus in accordance with claim 1, wherein said judging means initializes a scroll position when said designated scroll dot number is smaller than said predetermined number.

6. The image display apparatus in accordance with claim 2, wherein said judging means initializes a scroll position when said newly entered instruction designates the character units scroll.

* * * * *